US006299799B1

(12) United States Patent
Craig et al.

(10) Patent No.: US 6,299,799 B1
(45) Date of Patent: Oct. 9, 2001

(54) CERAMER COMPOSITIONS AND ANTISTATIC ABRASION RESISTANT CERAMERS MADE THEREFROM

(75) Inventors: Bradley D. Craig, Cottage Grove; Zayn Bilkadi, Mahtomedi, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/318,547

(22) Filed: May 27, 1999

(51) Int. Cl.$^7$ ...................................... H01B 1/14
(52) U.S. Cl. ..................... 252/500; 501/133; 428/922
(58) Field of Search ............................ 252/500; 428/357, 428/922; 501/133

(56) References Cited

U.S. PATENT DOCUMENTS

| | | | |
|---|---|---|---|
| 4,455,205 | 6/1984 | Olson et al. | 204/159.13 |
| 4,478,876 | 10/1984 | Chung | 427/54.1 |
| 4,486,504 | 12/1984 | Chung | 428/412 |
| 4,491,508 | 1/1985 | Olson et al. | 204/159.13 |
| 5,051,351 | 9/1991 | Tabor et al. | 430/570 |
| 5,126,394 | 6/1992 | Revis et al. | 524/548 |
| 5,200,112 | 4/1993 | Angelopoulos et al. | 252/500 |
| 5,202,061 | 4/1993 | Angelopoulos et al. | 252/500 |
| 5,258,225 | 11/1993 | Katsamberis | 428/331 |
| 5,300,575 | 4/1994 | Jonas et al. | 525/186 |
| 5,370,825 | 12/1994 | Angelopoulos et al. | 252/500 |
| 5,501,351 | 3/1996 | Niles et al. | 220/4.21 |
| 5,677,050 | 10/1997 | Bilkadi et al. | |
| 5,708,048 | 1/1998 | Medford et al. | |
| 5,721,299 | 2/1998 | Angelopoulos et al. | 524/177 |
| 5,750,054 | 5/1998 | Cinquina et al. | 252/500 |
| 5,759,637 | 6/1998 | Angelopoulos et al. | 427/504 |
| 5,770,216 | 6/1998 | Mitchnick et al. | 428/402 |
| 6,066,269 | * 5/2000 | Wei et al. | 252/500 |

FOREIGN PATENT DOCUMENTS

| | | |
|---|---|---|
| 0 567 835 A1 | 11/1993 | (EP) . |
| 0 576 247 A2 | 12/1993 | (EP) . |
| 0 752 454 A2 | 1/1997 | (EP) . |
| 0 774 496 A1 | 5/1997 | (EP) . |
| WO 96/36669 | 11/1996 | (WO) . |
| WO 99/02611 | 1/1999 | (WO) . |

OTHER PUBLICATIONS

Japanese Patent Abstract for Japanese Application No. 09/316366 Dec. 1997.
Bayer Data Sheet A1 4071 publication date Apr. 1995.
Conquest XP 1100 Product Data Sheet, publication date unknown.

\* cited by examiner

Primary Examiner—Mark Kopec
(74) Attorney, Agent, or Firm—Scott R. Pribnow

(57) ABSTRACT

The present invention relates to ceramer compositions capable of being cured to form antistatic, abrasion resistant ceramers. The ceramer compositons comprise a plurality of colloidal silica particles, a binder precursor, and an electrically conductive organic polymer, for example, polythiophene. The present invention also relates to ceramer articles, for example, ceramer coatings and shaped ceramer particles made from the ceramer compositions and to methods of making the ceramer compositions and ceramer articles.

42 Claims, 4 Drawing Sheets

CERAMER COMPOSITIONS AND ANTISTATIC ABRASION RESISTANT CERAMERS MADE THEREFROM

TECHNICAL FIELD

The present invention relates to ceramer compositions comprising an electrically conductive organic polymer, abrasion resistant, antistatic ceramer articles prepared from these ceramer compositions, and to methods of making these ceramers and ceramer compositions.

BACKGROUND

The incorporation of additives into polymers are known in the art. There has been extensive use of additives, such as antifog agents, antioxidants, plasticisers, stabilizers, infrared absorbers, biocides, flame retardants, fillers, lubricants, non-ionic surfactants, etc., in polymer technology. Such additives may be in the form of, for example, liquids, pastes, waxy low-melting solutions, or solids.

Plastics are electrically insulative and may generate and accumulate static electricity by contact or friction with material or by being peeled from a material during production or use thereof. Plastics having high electrical conductivity are able to avoid the accumulation of electricity and therefore are antistatic. Optically transparent electrically conductive coatings are known in the art for use in display devices, photoconductive components, and solar photovolaic cells. U.S. Pat. No. 5,770,216 discusses films containing zinc oxide particles as additives. U.S. Pat. No. 5,300,575 discusses plastic films containing polythiophene compounds having high electrical conductivity.

Some antistatic coatings fail to conduct electricity under relatively low humidity. For example, antistatic coatings comprising ionic conductors dispersed in organic matrices typically require water to conduct electricity. Charge is transported in the presence of water and conduction of electricity may stop when the antistatic coating is placed under approximately 20% relative humidity. Unlike ionic conductors, an electrically conducting organic material, such as polythiophene, dispersed in an organic matrix is capable of conducting electricity below about 20% humidity. Conduction of electricity may occur when the organic matrix containing the electrically conductive organic polymer is placed in a relatively dry environment because electrons move through conjugated double bonds located within the polymer backbone. However, an organic matrix comprising an electrically conductive organic polymer may be easily scratched limiting the use of the polymer under certain circumstances.

SUMMARY

The present invention provides ceramer compositions capable of being cured to form abrasion resistant, antistatic ceramers. Ceramer compositions of the present invention comprise a plurality of colloidal silica particles, a binder precursor, and a dispersion of an electrically conductive organic polymer. In a preferred embodiment, the ceramer composition further comprises an amide-containing compound. Such amide-containing compounds increase the transparency of the cured ceramer. The ceramer composition may further comprise colloidal inorganic oxide particles, coupling agents, coating modifying agents (e.g., initiators and photosensitizers), surfactants, and other optional additives.

The present invention also embodies ceramer articles made from the ceramer compositions. Such ceramer articles may comprise a substrate having a ceramer coating adhered to at least a portion of the surface of the substrate. Suitable substrates include, for example, polymer film, glass, ceramic, metal, and the like. A particularly suitable substrate is an electronic storage container. Ceramer articles may also comprise, for example, shaped ceramer particles.

The present invention also embodies a method of making a ceramer composition for producing a transparent ceramer having antistatic properties and abrasion resistance. The method comprises the steps of: a) combining an aqueous silica sol with optional coupling agents and a binder precursor to form a mixture; b) drying the mixture of step a) so that the mixture is substantially free of water; c) mixing an amide-containing compound with an electrically conductive organic polymer to form a dispersion of electrically conductive organic polymers; and d) combining the dispersion of electrically conductive organic polymer of step c) with the mixture of step b) to form the ceramer composition. An antistatic, abrasion resistant ceramer is produced when the material of step d) is cured.

The present invention also includes a method of making a ceramer composition, the method including the steps of: a) combining an aqueous silica sol with optional coupling agents and at least one organic monomer to form a mixture; b) drying the mixture of step a) so that the mixture is substantially free of water; and c) combining an electrically conductive organic polymer with the mixture of step b) to form a ceramer composition. An antistatic, abrasion resistant ceramer is produced when the material of step c) is cured.

As used herein with respect to the present invention, the following shall apply:

"Binder" refers to solidified or hardened binder precursor.

"Binder precursor" refers to a curable composition comprising at least one reactive monomer, oligomer, or a combination thereof.

"Ceramer" refers to a cured ceramer composition.

"Ceramer composition" refers to a flowable dispersion comprising substantially non-aggregated, colloidal inorganic oxide particles (including at least silica particles) uniformly incorporated in at least one binder precursor.

"Coating" refers to a layer of ceramer.

"Coupling agent" refers to organic molecules wherein the molecules have a first functional group capable of covalent or ionic bonding to a silicate particle, an optional second functional group capable of reacting with an organic precursor, and a hydrophobic segment attached to the first functional group and located between the first and second functional groups if the second functional groups are present. A coupling agent may function as a dispersant.

"Curable" refers to a flowable material that can be transformed into a solid, substantially non-flowing material by means of cooling (to solidify hot melts), heating (to dry and solidify materials borne by solvent), and/or polymerization (e.g., chain extension, chemical crosslinking, radiation crosslinking, or the like).

DETAILED DESCRIPTION

The present invention provides ceramer compositions which may be cured to form abrasion resistant, antistatic ceramers. The ceramers may be provided in the form of a ceramer coating adhered to a substrate or they may be in the form of a ceramer article. Ceramer compositions of the present invention comprise a plurality of colloidal silica particles, a binder precursor, and an electrically conductive organic polymer. In a preferred embodiment, the ceramer composition further comprises an amide-containing compound. Optionally, the ceramer compositions may further comprise colloidal inorganic oxide particles, coupling agents, coating modifying agents (e.g., initiators and/or photosensitizers), surfactants, and other optional additives.

The ceramer compositions may be applied to various substrates such as wood, ceramics, polymers (e.g., acrylics, polyesters, polycarbonates, polyamides, polyolefins, polyurethanes, and vinyls), metal, glasses, and the like. The ceramer compositions are especially suited for application to electronic storage containers.

Figure 1:
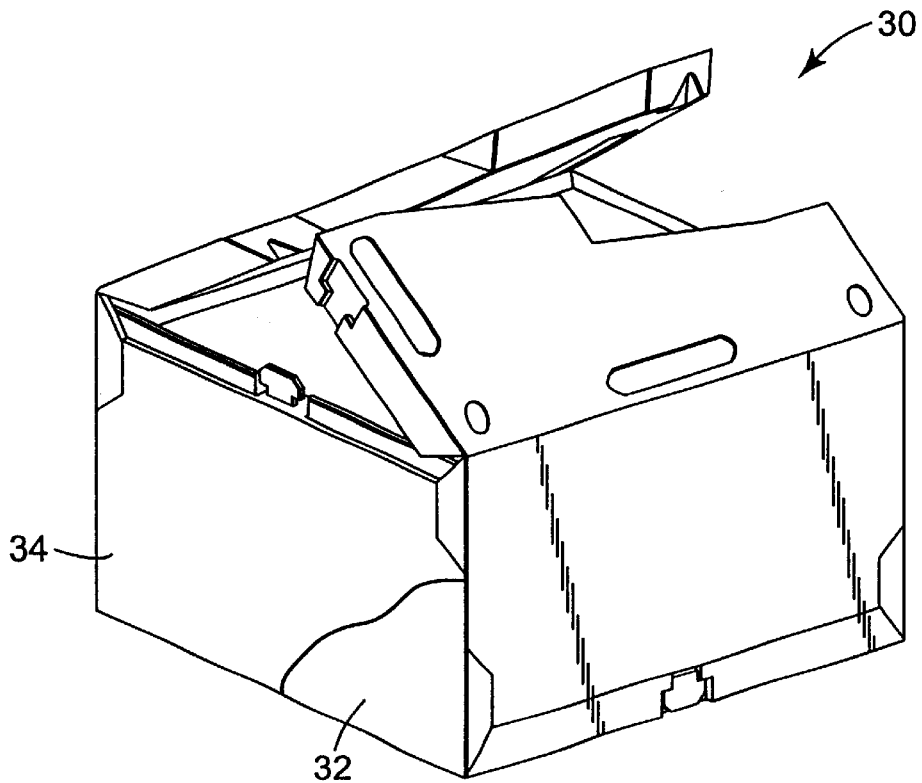
FIG. 1 is a perspective view of an electronic storage container coated with a ceramer.

FIG. 1 illustrates an anti-static storage container 30 comprising a storage container for electronic devices 32 and a ceramer coating 34 attached to the surface of the storage container 32. An example of an electronic storage container which may be coated with a ceramer of the present invention is reported in U.S. Pat. No. 5,051,351 (Niles et al.). Preferably, to provide optimum antistatic properties to the storage container, ceramer coating 34 covers both the interior and the exterior surfaces of storage container 32. Optionally, the storage container may be only partially coated with the ceramer composition. Ceramer coating 34 is abrasion resistant and anti-static even under conditions of low humidity. The coating helps to protect electronic devices stored in the coated storage container 30 by eliminating static electricity, which may damage the devices.

Figure 2:
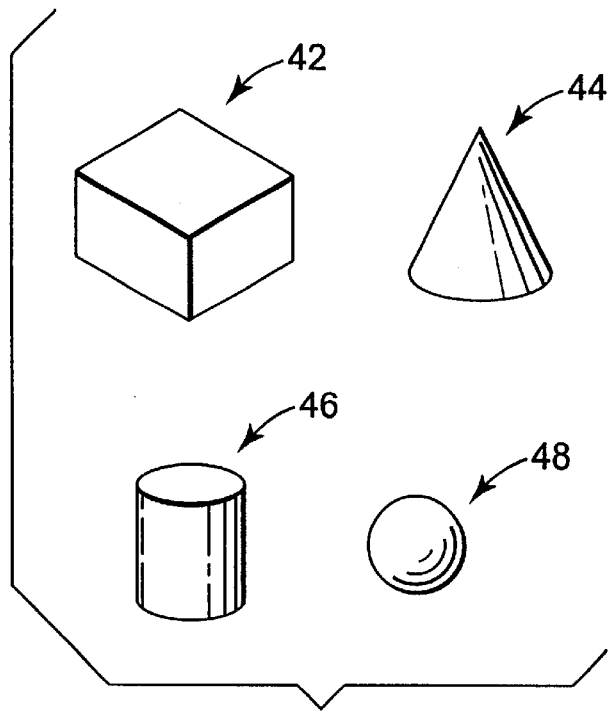
FIG. 2 is a perspective view of several ceramer articles.

The ceramer compositions of the present invention may be cured to form ceramer articles having a variety of shapes and sizes. FIG. 2 illustrates several geometrically shaped ceramer articles 40 that are made from ceramer compositions of the present invention. The shaped ceramer articles may have any desired shape, for example, they may be in the shape of a cube 42, a cone 44, a cylinder 46, and a sphere 48. The shape of the ceramer articles may be regular (e.g., geometric) or irregular. The shaped ceramer articles may be made by conventional methods including molding, embossing and extrusion. The ceramer articles of the present invention may be any size, but are preferably in the size range of about 0.1 to 10 millimeters.

Figure 3:
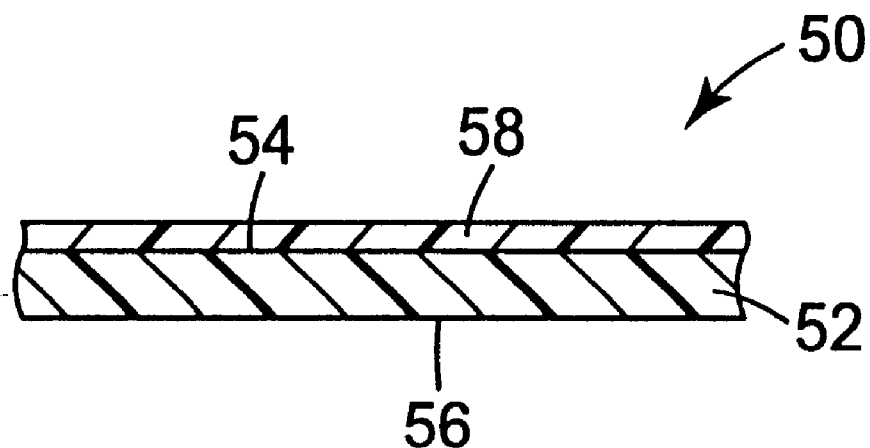
FIG. 3 is a cross sectional view of a ceramer coating on a substrate.

Referring now to FIG. 3, there is illustrated a ceramer of the present invention in the form of a coating on a sheet-like substrate. Ceramer coated substrate 50 includes sheet-like substrate 52 having first major surface 54 and second major surface 56. Ceramer coating 58 is bonded to first major surface 52 of sheet-like substrate 52 and is coterminous with the first major surface 52. Ceramer coating 58 comprises a plurality of colloidal silica particles and an electrically conductive organic polymer dispersed throughout a cured binder. Sheet-like substrate 52 may be a polymer film (e.g., polyester, acrylic, polycarbonate, polyolefin, polyimide, polyamide, vinyl), a glass sheet, a ceramic sheet, a metal (e.g., nickel), or any other electrically insulating material (e.g., wood). By way of example, the substrate may be a part of a storage container for electronic devices, an abrasive article, the face of an electronic display device, a packaging material, a floor covering, a wall covering, a window covering, or a pressure sensitive adhesive tape. Optionally, the second major surface 56 of sheet-like substrate 52 may also be coated with a ceramer coating. 26.

Figure 3A:
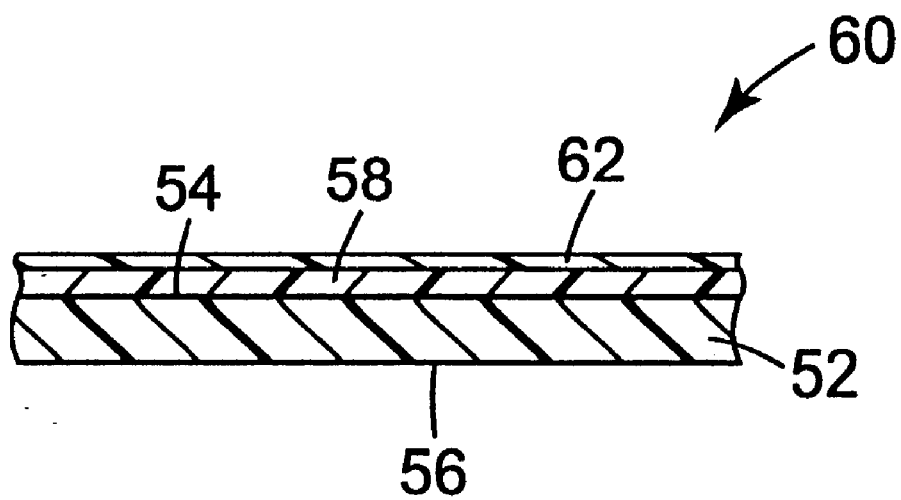
FIG. 3a is a cross sectional view of a ceramer coating on a substrate.

Referring now to FIG. 3a, there is illustrated a ceramer of the present invention in the form of a coating on a sheet-like substrate. In embodiment 60, ceramer coating 58 is top coated with an electrically insulating, abrasion resistant topcoat 62. Topcoat 62 may be any desired abrasion resistant coating, for example, a polymerized multifunctional acrylate abrasion resistant coating. Preferably, the abrasion resistance of topcoat 62 is greater than the abrasion resistance of the ceramer coating 58. In this way, topcoat 62 increases the level of abrasion resistance provided to sheet-like substrate 52. In order to maintain anti-static properties, topcoat 62 is preferably applied in a very thin layer or coating to minimize the electrically insulating effect of the topcoat.

The components of a ceramer composition of the present invention will now be described in greater detail.

Electrically Conductive Organic Polymer

Suitable electrically conductive organic polymers used in the practice of the present invention include polypyrroles, polythiophenes, polyanilines, and combinations thereof. It is preferred that the electrically conductive organic polymer is associated with a counter-ion for purposes of stabilizing the electrically conductive organic polymer within the ceramer composition. The preferred electrically conductive organic polymers are charged and include 3,4-polyethylenedioxythiophene, polypyrrole, polyaniline, and combinations thereof. The most preferred electrically conductive organic polymer is 3,4-polyethylenedioxythiophene stabilized with the counter-ion polystyrene sulfonate.

Ceramer compositions of the present invention typically include about 0.05 to about 50 weight percent of the electrically conductive organic polymer. Preferably, a ceramer composition of the present invention includes about 0.05 to about 5 weight percent of the electrically conductive organic polymer. Most preferably, to provide an optically transparent ceramer, a ceramer composition of the present invention comprises less than 1 percent of the electrically conductive organic polymer.

Amide-Containing Compounds

A wide variety of amide-containing compounds may be used in the practice of the present invention. Suitable amide-containing compounds include N,N-disubstituted acetamides, N,N-disubstituted formamides, N,N-disubstituted acrylamides, N-substituted pyrolidinones, N-substituted formamides, N-substituted caprolactams, or combinations thereof. Preferred amide-containing compounds include N,N-dimethyl acetamide, 1-vinyl-2-pyrrolidinone, N-methylpyrrolidinone, N-vinyl caprolactam, N-vinyl formamide, N,N-dimethylacrylamide, or combinations thereof. Typically, ceramer compositions of the present invention include about 1 to about 90 weight percent of an amide-containing compound. The present invention also embodies a ceramer composition in which the amide-containing compound is a binder precursor. A ceramer composition of the present invention, capable of producing a transparent ceramer, comprises silica particles, an amide-containing compound, a binder precursor substantially free of an amide, and an electrically conductive organic polymer. Another ceramer composition of the present invention, capable of producing a transparent ceramer, comprises silica particles, an amide-containing compound, a binder precursor containing amide groups, and an electrically conductive organic polymer. Another ceramer of the present invention capable of producing a transparent ceramer comprises silica particles and a binder precursor having enough amide groups to disperse the electrically conductive organic polymer, and an electrically conductive organic polymer. A ceramer composition of the present invention comprising an amide-containing compound that is not a binder precursor will form a transparent ceramer substantially free of an amide-containing compound because the amide-containing compound will evaporate during the curing of the ceramer composition.

Figure 4:
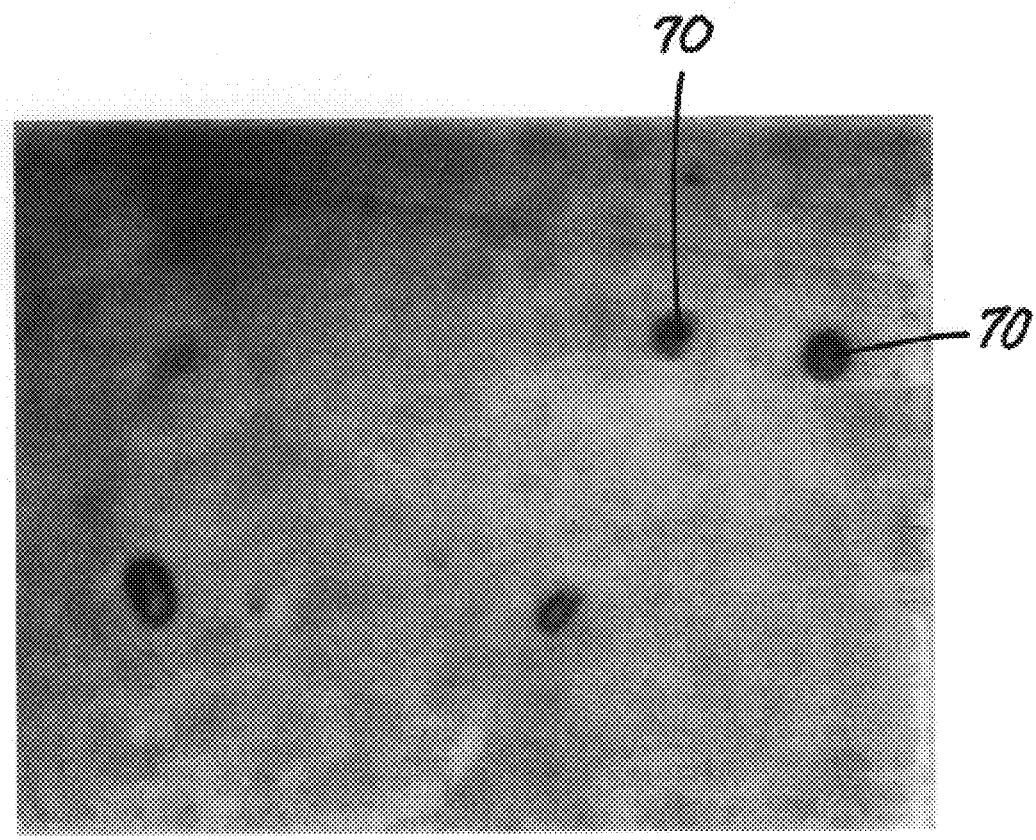
FIG. 4 is a photograph of a ceramer coating prepared from a ceramer composition substantially free of an amide-containing compound.
Figure 5:
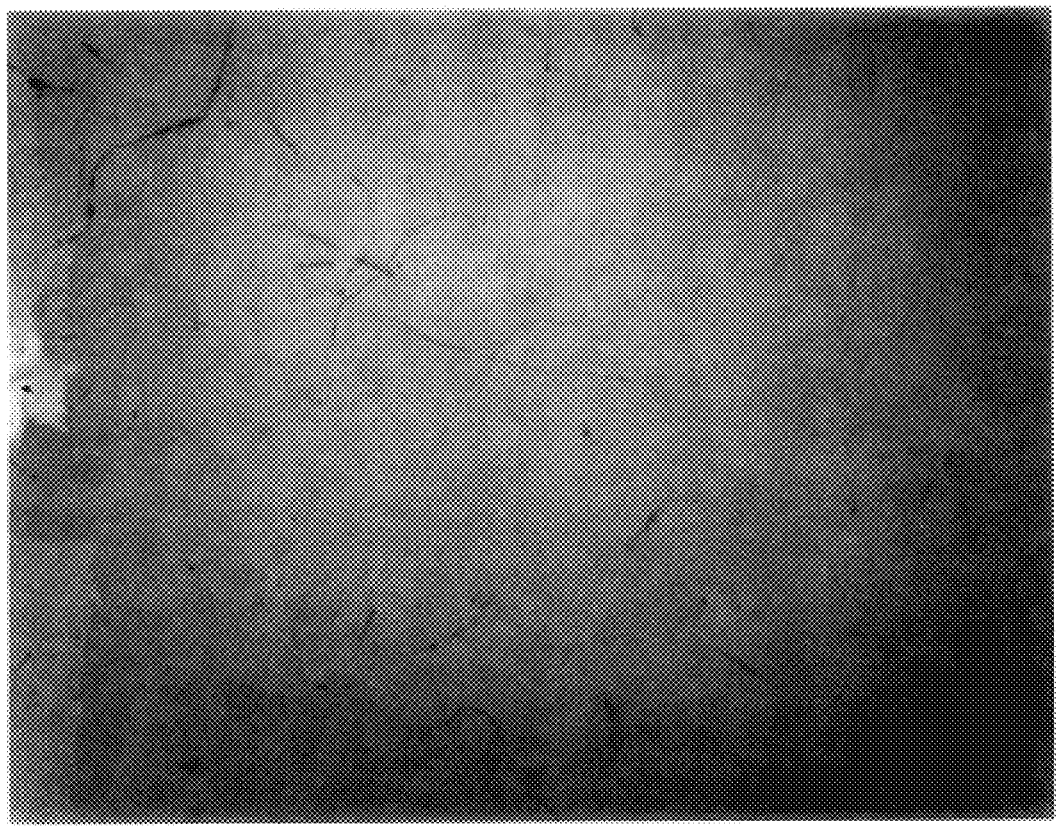
FIG. 5 is a photograph of a ceramer coating prepared from a ceramer composition comprising an amide-containing compound.

An amide-containing compound is added to a ceramer composition of the present invention for the purpose of increasing the transparency of the final ceramer. It is believed that the amide in combination with the silica particles assists in the dispersion of the electrically conductive polymer. FIG. 4 is a photograph of a ceramer coating substantially free of an amide-containing compound and FIG. 5 is a photograph of a ceramer coating containing an amide-containing compound. FIG. 4, in contrast to FIG. 5, illustrates a ceramer coating containing flecks or specs 70. The addition of the amide to ceramer compositions, based on some of the compositions tested, resulted in ceramers that are substantially free of flecks or specs 70. While not wanting to be bound by any particular theory, it is believed that the flecks or specs 70 are a result of the precipitation of the electrically conductive polymer. A transparent coating, in part, refers to a ceramer coating that is substantially free of flecks or specs.

Colloidal Inorganic Oxide Particles

The ceramer compositions of the present invention include a plurality of colloidal silica particles. Colloidal silica particles increase the abrasion resistance of ceramers of the present invention and aid in the stabilization of the electrically conductive organic polymer. The silica particles are preferably provided in the form of a silica sol which may be prepared by methods well known in the art. As used herein, "sol" shall refer to a colloidal dispersion of substantially non-aggregated, inorganic oxide particles in a liquid medium. Colloidal silicas uniformly incorporated as sols in aqueous solutions are available commercially under the trade designation "LUDOX" (commercially available from E.I. DuPont de Nemours and Co., Wilmington, Del.), "NYACOL" (commercially available from Nyacol Co., Ashland, Mass.), and "NALCO" (commercially available from Nalco Chemical Co., Oak Brook, Ill.). Nonaqueous silica sols (also called silica organosols) are also commercially available under the trade designation "NALCO 1057" (a silica sol in 2-propoxyethanol, commercially available from Nalco Chemical Co.), "MA-ST, IP-ST" and "EG-ST" (commercially available from Nissan Chemical Ind., Tokyo, Japan). The colloidal silica particles preferably have an average particle diameter of about 5 to about 100 nm, more preferably ranging from about 10 to about 50 nm. The average particle size may be determined using transmission electron microscopy. Additional examples of suitable colloidal silicas are described in U.S. Pat. No. 5,126,394 (Bilkadi), the disclosure of which is incorporated herein by reference. It is preferred that the silica sols used in the practice of the present invention have a pH in the range of about 2 to about 6 or about 8 to about 11.

Preferably, the colloidal silica particles are functionalized with a coupling agent. More preferably, the silica particles are (meth)acrylate functionalized. Herein, "(meth)acrylate functionalized" means the silica particles are functionalized with a (meth)acrylate terminated organofunctional silane. The functionalized particles bond intimately and isotropically with the binder. Typically, the colloidal silica particles are functionalized by adding a (meth)acrylate functionalized silane to aqueous colloidal silica. Examples of (meth)acrylate functionalized colloidal silica are reported in U.S. Pat. Nos. 4,491,508 (Olsen et al.), 4,455,205 (Olsen et al.), 4,478,876 (Chung), 4,486,504 (Chung), and 5,258,225 (Katsamberis). Typically, ceramer compositions of the present invention include about 5 to about 65 weight percent colloidal silica particles, more preferably about 10 to about 50 weight percent colloidal silica particles, and most preferably about 30 to about 50 weight percent colloidal silica particles. Curing the ceramer composition produces the ceramers of the present invention. Consequently, the ceramers comprise approximately the same weight percentages of silica particles as the ceramer compositions, less any volatile components, used to make the ceramers.

In addition to silica, the colloidal inorganic particles may further include colloidal particles of higher refractive index than silica. Examples of such higher index colloidal particles include, but are not limited to, alumina, titania, zirconia, ceria, and antimony oxide sols, all of which are commercially available from suppliers such as Nyacol Co. and Nalco Chemical Co.

It is highly desirable that the colloidal inorganic particles used to make a ceramer be derived from a sol. If a powder of colloidal particles is used to make a ceramer composition, an intractable mass may form creating a coating unsuitable for most applications. For example, it has been observed that the uses of compositions containing powder of colloidal dimensions have resulted in ceramer coatings having relatively poor optical transparency and poor flow properties for coating. Therefore, the use of powder of colloidal dimensions is not preferable in ceramer compositions of the present invention.

Coupling Agent

Ceramer compositions of the present invention containing one or more coupling agents typically produce ceramers having better abrasion resistance, weather resistance, and solvent resistance than ceramer compositions substantially free of coupling agents. Examples of coupling agents used in the practice of the present invention include a wide variety of organofunctional silane monomers such as mono- and poly-functional organosilicon compounds. The preferred organofunctional silanes are hydrolyzable organofunctional silanes, also known in the art as "coupling agents" for coupling silica particles to organic materials. Representative examples include methyl trimethoxysilane, methyl triethoxysilane, phenyl trimethoxysilane, phenyl triethoxysilane, (meth)acryloyloxyalkyl trimethoxysilanes, such as methacryloyloxypropyl trimethoxysilane, (meth)acryloyloxypropyl trichlorosilane, phenyl trichlorosilane, vinyl trimethoxysilane, vinyl triethoxysilane, propyl trimethoxysilane, propyl triethoxysilane, glycidoxypropyl trimethoxysilane, glycidoxypropyl triethoxysilane, glycidoxypropyl trichlorosilane, perfluoro alkyl trimethoxysilane, perfluoro alkyl triethoxysilane, perfluoromethyl alkyl trimethoxysilanes, such as 1,1,1-triflouroethyl trimethoxysilane, tridecafluoro-1,1,2,2 tetrahydrooctyl trimethoxysilane, perfluoroalkyl trichlorosilanes, trifluoromethylpropyl trimethoxysilane, trifluoromethylpropyl trichlorosilane, and perfluorinated sulfonimido alkyl trimethoxysilane (such FC405 available from the Minnesota Mining and Manufacturing Company, St. Paul, Minn.), combinations of these, and the like. Preferred coupling agents are selected from the group consisting of 3-(trimethoxysilyl)propylmethacrylate, 3-(triethoxysilyl)propylmethacrylte, 3-(trimethoxysilyl)propylacrylte, vinyltrimethoxysilane, vinyltriethoxysilane, and combinations thereof. Typically, the ceramer compositions of the present invention include about 0.5 to about 15 weight percent of a particular coupling agent. It is preferred that a ceramer of the present invention includes about 1 to about 10 weight percent of a coupling agent and it is most preferred that a ceramer of the present invention includes about 5 to about 10 weight percent of a particular coupling agent.

Binder Precursor

Preferably, the ethylenically unsaturated binder precursor is a monofunctional ethylenically unsaturated monomer, a multifunctional ethylenically unsaturated monomer, an oligomer, or a combination thereof. Suitable organic monomers that may be used in the practice of the present invention include (meth)acrylic acid, (meth)acrylic acid esters, or amides such as N,N-dimethylacrylamide, pentaerythritol triacrylate, 2-hydroxyethylacrylate, N-vinyl caprolactam, N-vinyl pyrrolidinone, N-vinyl formamide, or combinations thereof.

The multifunctional ethylenically unsaturated monomer is preferably an ester of (meth)acrylic acid. It is more preferably selected from the group consisting of a difunctional ethylenically unsaturated ester of acrylic or methacrylic acid, a trifunctional ethylenically unsaturated ester of acrylic or methacrylic acid, a tetrafunctional ethylenically unsaturated ester of acrylic or methacrylic acid, and a combination thereof. Of these, difunctional and trifunctional ethylenically unsaturated esters of (meth)acrylic acid are most preferred.

Preferred multifunctional ethylenically unsaturated esters of acrylic acid have a refractive index of about 1.40 to about 1.65 and can be described by the formula:

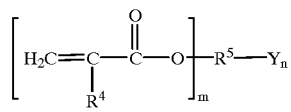

where

R$^4$ is hydrogen, halogen, or a (C$_4$–C$_4$)alkyl group (preferably R$^4$ is hydrogen or a methyl group);

R$^5$ is a polyvalent organic group, which can be cyclic, branched, or linear; aliphatic, aromatic, or heterocyclic; having carbon, hydrogen, nitrogen, nonperoxidic oxygen, sulfur, or phosphorus atoms;

Y is hydrogen, C$_1$ to C$_4$ alkyl, or a protic functional group;

m is an integer designating the number of acrylic or methacrylic groups in the ester and has a value of at least 2; and n has a value of the valence of R$^5$–m.

Referring to this formula, preferably, R$^5$ has a molecular weight of about 14 to about 100, m has a value of 2 to 6 (more preferably, m has a value of 2 to 5, and most preferably, m has a value of 2 to 3, where a mixture of multifunctional acrylates and/or methacrylates are used, m has an average value of about 2.05 to 5), and n has a value of 1 to 3. Preferred protic functional groups are selected from the group consisting of —OH, —COOH, —SH, —PO(OH)$_2$, —SO$_3$H, and —SO(OH)$_2$.

Examples of suitable multifunctional ethylenically unsaturated esters of (meth)acrylic acid are the polyacrylic acid or polymethacrylic acid esters of polyhydric alcohols including, for example, the diacrylic acid and dimethylacrylic acid ester of aliphatic diols such as ethyleneglycol, triethyleneglycol, 2,2-dimethyl-1,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol; the triacrylic acid and trimethacrylic acid esters of aliphatic triols such as glycerin, 1,2,3-propanetrimethanol, 1,2,4-butanetriol, 1,2,5-pentanetriol, 1,3,6-hexanetriol, and 1,5,10-decanetriol; the triacrylic acid and trimethacrylic acid esters of tris(hydroxyethyl) isocyanurate; the tetraacrylic and tetramethacrylic acid esters of aliphatic triols, such as 1,2,3,4-butanetetrol, 1,1,2,2,-tetramethylolethane, 1,1,3,3-tetramethylolpropane, and pentaerythritol tetraacrylate; the pentaacrylic acid and pentamethacrylic acid esters of aliphatic pentols such as adonitol; the hexaacrylic acid and hexamethacrylic acid esters of hexanols such as sorbitol and dipentaerythritol; the diacrylic acid and dimethacrylic acid esters of aromatic diols such as resorcinol, pyrocatechol, bisphenol A, and bis(2-hydroxyethyl) phthalate; the trimethacrylic acid ester of aromatic triols such as pyrogallol, phloroglucinol, and 2-phenyl-2,2-methylolethanol; and the hexaacrylic acid and hexamethacrylic acid esters of dihydroxy ethyl hydantoin; and mixtures thereof.

Preferably, the multifunctional ethylenically unsaturated ester of (meth)acrylic acid is a nonpolyethereal multifunctional ethylenically unsaturated ester of (meth)acrylic acid. More preferably, the multifunctional ethylenically unsaturated ester of (meth)acrylic acid is selected from the group consisting of pentaerythritol triacrylate (PETA), pentaerythritol trimethacrylate, and a combination thereof. Most preferably, the multifunctional ethylenically unsaturated ester of (meth)acrylic acid is pentaerythritol triacrylate.

In addition to the multifunctional ethylenically unsaturated esters of acrylic acid, the ceramer composition may include a monofunctional ethylenically unsaturated ester of (meth)acrylic acid (i.e., an alkyl and/or aryl acrylate or methacrylate). Preferably, the alkyl group of the (meth) acrylate has about 4 to about 14 carbon atoms (on average). The alkyl group can optionally contain oxygen atoms in the chain thereby forming ethers, for example. Preferably, the aryl group of the (meth)acrylate has about 6 to about 20 carbon atoms (on average). Examples include, but are not limited to, 2-hydroxyethyl (meth)acrylate, 2-methylbutyl (meth)acrylate, 4-methyl-2-pentyl (meth)acrylate, isoamyl (meth)acrylate, sec-butyl (meth)acrylate, n-butyl (meth)acrylate, n-hexyl (meth)acrylate, 2-ethylhexyl (meth)acrylate, isodecyl (meth)acrylate, and isononyl (meth)acrylate, 2,2'-(ethoxyethoxy)ethyl (meth)acrylate, 2-hydroxypropyl (meth)acrylate, 3-hydroxypropyl (meth)acrylate, t-butyl (meth)acrylate, isobornyl (meth)acrylate, 2-(phenoxy)ethyl (meth)acrylate, biphenyl (meth)acrylate, t-butylphenyl (meth)acrylate, cyclohexyl (meth)acrylate, dimethyladamantyl (meth)acrylate, 2-naphthyl (meth) acrylate, phenyl (meth)acrylate. Other examples include, but are not limited to, poly-ethoxylated or poly-propoxylated methoxy (meth)acrylate (i.e., poly(ethylene/propylene oxide) mono-(meth)acrylate) macromers (i.e., macromolecular monomers), polymethylvinyl ether mono(meth) acrylate macromers, and ethoxylated or propoxylated nonylphenol acrylate macromers. The molecular weight of such macromers (i.e., macromolecular monomers) is typically about 100 to about 600 grams/mole, and preferably, about 300 to about 600 grams/mole. Preferred monofunctional (meth)acrylates that can be used include 2-methylbutyl acrylate, isooctyl acrylate, lauryl acrylate, and methoxy-capped poly(ethylene glycol) mono-methacrylate.

The monofunctional ethylenically unsaturated monomer may also be selected from the group of a (meth)acrylamide, an alpha-olefin, a vinyl ether, a vinyl ester, and a combination thereof. Examples include, but are not limited to, acrylic acid, methacrylic acid, itaconic acid, crotonic acid, maleic acid, fumaric acid, 2,2'-(ethoxyethoxy)ethyl acrylate, 2-hydroxypropyl acrylate or methacrylate, 3-hydroxypropyl acrylate or methacrylate, t-butyl acrylate, methacrylate, isobornyl acrylate, 2-(phenoxy)ethyl acrylate or methacrylate, biphenylyl acrylate, t-butylphenyl acrylate, phenyl acrylate. Preferred monofunctional acrylic monomers include acrylic acid, t-butyl acrylate, N,N-dimethyl acrylamide, 1,1,3,3-tetramethylbutyl acrylamide, N-octyl acrylamide, 2-(phenoxy) ethyl acrylate, 2-hydroxypropyl acrylate, 3-hydroxypropyl acrylate, isobornyl acrylate, and 2-(phenoxy)ethyl acrylate. Other examples include acrylamides, such as acrylamide, methacrylamide, N-methyl acrylamide, N-ethyl acrylamide, N-methylol acrylamide, N-hydroxyethyl acrylamide, diacetone acrylamide, N,N-dimethyl acrylamide, N,N-diethyl acrylamide, N-ethyl-N-aminoethyl acrylamide, N-ethyl-N-hydroxyethyl acrylamide, N,N-dimethylol acrylamide, N,N-dihydroxyethyl acrylamide, t-butyl acrylamide, dimethylaminoethyl acrylamide, N-octyl acrylamide (normal and branched), N-vinyl pyrrolidinone, and N-vinyl caprolactam and 1,1,3,3-tetramethylbutyl acrylamide. These above mentioned amide-containing binder precursors may also act as the amide-containing compound and stabilize the electrically conductive organic polymer.

In general, the acrylamide compounds have the following formula:

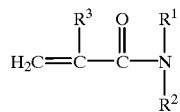

where:
- $R_1$ and $R^2$ are each independently hydrogen, a $C_1$–$C_8$ alkyl group optionally having hydroxy, halide, carbonyl, and amido functionalities, a $C_1$–$C_8$ alkylene group optionally having carbonyl and amido functionalities, a $C_1$–$C_4$ alkoxymethyl group, a $C_4$–$C_{18}$ aryl group, a $C_1$–$C_3$ alk $C_4$–$C_{18}$ aryl group, and a $C_4$–$C_{18}$ heteroaryl group; with the proviso that no more than one of $R^1$ and $R^2$ is hydrogen; and
- $R^3$ is hydrogen, a halogen, or a methyl group. Preferably, $R^1$ is a $C_1$–$C_4$ alkyl group; $R^2$ is a $C_1$–$C_4$ alkyl group; and $R^3$ is hydrogen, a halogen, or a methyl group. $R^1$ and $R^2$ can be the same or different. More preferably, each of $R^1$ and $R^2$ is $CH_3$, and $R^3$ is hydrogen.

Examples of suitable acrylamides are N-(3-bromopropionamidomethyl)acrylamide, N-tert-butylacrylamide, N,N-dimethylacrylamide, N,N-dimethylacrylamide, N-(5,5-dimethylhexyl)acrylamide, N-(1,1-dimethyl-3-oxobutyl)acrylamide, N-(hydroxymethyl)acrylamide, N-(isobutoxymethyl) acrylamide, N-isopropylacrylamide, N-methylacrylamide, N-ethylacrylamide, N-methyl-N-ethylacrylamide, N-(fluoren-2-yl)acrylamide, N-(2-fluorenyl)-2-methylacrylamide, 2,3-bis(2-furyl)acrylamide, N,N'-methylene-bis acrylamide. A particularly preferred acrylamide is N,N-dimethyl acrylamide.

A ceramer composition of the present invention preferably includes an organic matrix and colloidal inorganic particles that at least include silica. Preferably, the binder is prepared from a curable organic binder precursor that includes an ethylenically unsaturated monomer selected from the group of a multifunctional ethylenically unsaturated ester of (meth)acrylic acid, a monofunctional ethylenically unsaturated monomer (e.g., an ester or amide), and combinations thereof; and an optional organofunctional silane coupling agent.

The ceramer composition preferably includes less than about 80 percent by weight (weight percent) and typically greater than 5 weight percent of at least one ethylenically unsaturated monomer.

If the ethylenically unsaturated monomers include a mixture of multifunctional and monofunctional ethylenically unsaturated monomers, the multifunctional monomer is preferably in an amount of at least about 20 weight percent, and the monofunctional monomer is preferably in an amount of at least about 5 weight percent. Preferably, the multifunctional monomer is in an amount of no greater than about 60 weight percent and the monofunctional monomer is used in an amount of no greater than about 20 weight percent.

Curing Agent

During the manufacture of an antistatic ceramer, the ceramer composition is exposed to an energy source (e.g., heat, ultraviolet light or electron beam) that initiates the curing of the binder precursor of the ceramer composition. This curing process typically occurs via a free radical mechanism, which can require the use of a free radical initiator (simply referred to herein as an initiator, e.g., a photoinitiator or a thermal initiator). If the energy source is an electron beam, the electron beam generates free radicals and typically no initiator is required. If the energy source is heat, ultraviolet light, or visible light, an initiator is typically required. When the initiator is exposed to one of these energy sources, the initiator generates free radicals, which then initiate the polymerization and crosslinking.

Examples of suitable free radical thermal initiators include, but are not limited to, peroxides such as benzoyl peroxide, azo compounds, benzophenones, and quinones. Examples of photoinitiators that generate a free radical when exposed to visible light radiation include, but are not limited to, benzophenones. Examples of photoinitiators that generate a free radical when exposed to ultraviolet light include, but are not limited to, organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin, benzoin methyl ether, benzoin ethyl ether, benzoin isopropyl ether, benzoin isobutyl ethers and methylbenzoin, diketones such as benzil and diacetyl, phenones such as acetophenone, 2,2,2-tri-bromo-1-phenylethanone, 2,2-diethoxyacetophenone, 2,2-dimethoxy-2-phenylacetophenone, 2,2,2,-tribromo-1(2-nitrophenyl) ethanone, benzophenone, and 4,4-bis(dimethyamino) benzophenone. Examples of commercially available ultraviolet photoinitiators include those available under the trade names IRGACURE 184 (1-hydroxycyclohexyl phenyl ketone), IRGACURE 361, and DAROCUR 1173 (2-hydroxy-2-methyl-1-phenyl-propan-1-one) (commercially available from Ciba-Geigy, Hawthorn, N.Y.). Typically, if used, an amount of an initiator is included in the precursor composition to effect the desired level and rate of cure. Preferably, the initiator is used in an amount of about 0.1 to about 10 weight percent, more preferably, about 2 to about 4 weight percent, based on the total weight of the ceramer composition without solvent. It should be understood that combinations of different initiators may be used.

In addition to the initiator, the ceramer composition of the present invention can include a photosensitizer. The photosensitizer aids in the formation of free radicals that initiate curing of the precursor composition, especially in an air atmosphere. Suitable photosensitizers include, but are not limited to, aromatic ketones and tertiary amines. Suitable aromatic ketones include, but are not limited to, benzophenone, acetophenone, benzil, benzaldehyde, and o-chlorobenzaldehyde, xanthone, tioxanthone, 9,10-anthraquinone, and many other aromatic ketones. Suitable tertiary amines include, but are not limited to, methyldiethanolamine, ethyldiethanolamine, triethanolamine, phenylmethyl-ethanolamine, dimethylaminoethylbenzoate, and the like. Preferably, the amount of photosensitizer used in the compositions of the present invention is about 0.01 to about 10 weight percent, more preferably, about 0.05 to about 5 weight percent, and most preferably, about 0.25 to about 3 weight percent, based on the total weight of the ceramer composition. It should be understood that combinations of different photosensitizers may be used if desired.

Optional Additives

The ceramer composition may also include a leveling agent to improve the flow or wetting of the ceramer composition on a substrate. If the ceramer composition does not properly wet the substrate, this can lead to visual imperfections (e.g., pin holes and/or ridges) in the coating. Examples of leveling agents include, but are not limited to, alkoxy terminated polysilicones such as that available under the trade designation "DOW 57" (a mixture of dimethyl-, methyl-, and (polyethylene oxide acetate)-capped siloxane, commercially available from Dow Corning, Midland, Mich.), and fluorochemical surfactants such as those available under the trade designations "FC430", "FC431", and "FX313", (commercially available from Minnesota Mining and Manufacturing Company). The ceramer composition can include an amount of a leveling agent to impart the desired result. Preferably, the leveling agent is present in an amount up to about 3 weight percent, and more preferably, about 0.5 to about 1 weight percent, based on the total weight of the ceramer composition. It should be understood that combinations of different leveling agents may be used if desired.

Additionally, if silane coupling agents are used, it may be desirable in some instances to add about 1 weight percent relative to the weight of the coupling agent to about 3 weight percent glacial acetic acid or similar carboxylic acids as a catalyst for the hydrolysis of the organofunctional silane.

Polymeric materials are known to degrade by a variety of mechanisms. Common additives that can offset this are known as stabilizers, absorbers, antioxidants, and the like. The ceramer compositions of the present invention can include one or more of the following: ultraviolet stabilizer, ultraviolet absorber, ozone stabilizer, and thermal stabilizer/antioxidant.

An ultraviolet stabilizer and/or ultraviolet absorber may be added to a ceramer composition for improving weatherability and reducing the "yellowing" of the ceramer coating with time. An example of an ultraviolet stabilizer includes that available under the trade designation "TINUVIN 292" (bis(1,2,2,6,6-pentamethyl-4-piperidinyl)sebacate) and an example of an ultraviolet absorber includes that available under the trade name "TINUVIN 1130" (hydroxyphenyl benzotriazole), (both of which are commercially available from Ciba-Geigy Co.). The ceramer composition can include an amount of either an ultraviolet stabilizer and/or an ultraviolet absorber to impart the desired result. Preferably, the ultraviolet stabilizer or absorber is present in an amount up to about 10 weight percent, and more preferably, about 1 to about 5 weight percent, based on the total weight of the ceramer composition. It should be understood that combinations of different ultraviolet stabilizers and absorbers may be used if desired.

An ozone stabilizer protects against degradation resulting from reaction with ozone. Examples of ozone stabilizers include, but are not limited to, hindered amines such as that available under the trade designation "IRGONOX 1010" (commercially available from Ciba-Geigy Co.) and phenol-triazine (commercially available from Aldrich Chemical Co., Milwaukee, Wis.). The ceramer composition can include an amount of an ozone stabilizer to impart the desired result. Preferably, the ozone stabilizer is present in an amount up to about 1 weight percent, more preferably, about 0.1 to about 1.0 weight percent, and most preferably, about 0.3 to about 0.5 weight percent, based on the total weight of the ceramer composition.

Method of Making Ceramer Compositions and Ceramers

One method of making a ceramer composition of the present invention comprises the step of combining aqueous silica particles with at least one binder precursor and optionally with a coupling agent to form a mixture. This mixture is then dried under vacuum at a temperature of 55° C. to remove water and is then mixed with a curing agent and a solvent. Suitable solvents include alcohols and ketones such as isopropyl alcohol, ethanol, methyl ethyl ketone, acetone, or combinations thereof. It is preferred that if diluents or solvents are to be added to the mixture that they be added before the dispersion of electrically conductive organic polymer.

Independent of the above method, a dispersion of electrically conductive organic polymer may be combined with an optional amide-containing compound. Preferably, the dispersion of electrically conductive organic polymer is produced by combining an amide-containing compound with an electrically conductive organic polymer and a solvent. The amide-containing compound is combined with the electrically conductive organic polymer if a transparent ceramer is desired. Ceramer compositions substantially free of an amide-containing compound typically form ceramers that contain flecks with what appears to be aggregates of the electrically conductive polymer (see, FIG. 4). It is most preferred that an aqueous dispersion of the electrically conductive organic polymer be formed using water as the solvent. Some electrically conductive organic polymer dispersions may be made substantially free of a solvent. If a solvent is used, it is preferred to add the electrically conductive organic polymer to the amide-containing compound prior to the addition of the solvent. This order of addition of components maximizes the effect of the amide on the stability of the electrically conductive polymer in the final ceramer composition. The dispersion of electrically conductive organic polymer once formed and combined with the amide is then combined with a substantially nonaqueous ceramer composition to form a second ceramer composition. The ceramer compositions comprising electrically conductive organic polymer and silica particles are then hardened to form ceramers, for example, ceramer articles and ceramer coatings. Ceramer articles of the present invention preferably have a surface resistivity in the range of about $10^4$ to about $10^{12}$ ohms/square.

The ceramer composition can be applied to a substrate by any technique such as spray coating, knife coating, dip coating, flow coating, roll coating, and the like. In spray coating, the ceramer is atomized and then applied to the surface of the substrate. In dip coating, the substrate is immersed into the ceramer composition, and removed from the ceramer composition so that excess coating drips off of the substrate. In flow coating, the thermoplastic substrate is held in a vertical position and the ceramer is applied near the top of the substrate. The ceramer then flows down the substrate. In roll coating, the ceramer is applied to the substrate by a transfer roll.

After drying, the ceramer composition may be exposed to an energy source to cure the ceramer composition and form an abrasion resistant (or a hard) ceramer coating. This energy source can be thermal energy, electron beam, ultraviolet light, or visible light. The amount of energy required is primarily dependent on the chemistry of the precursor composition, as well as its thickness and density. For thermal energy, the oven temperature will typically range from about 50° C. to about 250° C. (preferably about 90° C. to about 110° C.) for about 15 minutes to about 16 hours. Electron beam radiation can be used at an energy level of about 0.1 megarad to about 10 megarad (Mrad), preferably at an energy level of about 1 Mrad to about 10 Mrad. Ultraviolet radiation refers to nonparticulate radiation having a wavelength within the range of about 200 to about 400 nm, preferably within the range of about 250 to 400 nm. It is preferred that ultraviolet light have an energy level of at least 300 Watts/inch (120 Watts/cm), preferably at least 600 Watts/inch (240 Watts/cm). Visible radiation refers to nonparticulate radiation having a wavelength within the range of about 400 to about 800 nm, preferably in the range of about 400 to about 550 nm.

The ceramer composition can be applied over the entire substrate surface or a portion thereof. The desired coating thickness of the ceramer composition will depend upon the formulation and the amount of solvent. Typically, the cured coating has a thickness of at least about 1 micron, and preferably, at least about 3 microns. Typically, the cured coating has a thickness of no greater than about 50 microns, preferably, no greater than about 30 microns, more preferably, no greater than about 10 microns, and most preferably, no greater than about 4 microns. The amount of the ceramer composition applied to the substrate may be adjusted to provide this coating thickness. The abrasion resistance of the ceramer coating typically decreases as the thickness of the coating falls below about 3 microns. The optical transparency of the coating appears to decrease as the thickness of the coating rises above about 30 microns.

The surface resistivity of the ceramer may be measured by a resistance meter at ambient room temperatures. Ceramers of the present invention preferably have a surface resistivity in the range of about $10^4$ to about $10^{12}$ ohms/square.

Suitable substrates for the practice of the invention include wood, ceramics, most polymers (including acrylics, polypropylenes, polyesters, polycarbonates, polyamides, polyolefins, polyurethanes, vinyls) some metals, and selected glasses, etc. The substrate may be storage containers for electronic devices, abrasive articles, faces of electronic display devices, packaging material, floor coverings, wall coverings, or blinds.

During the manufacture of the coated substrate, the ceramer composition is applied to at least a portion of the substrate. Preferably and advantageously, this ceramer composition is directly applied to the substrate. Optionally, the ceramer composition can be applied to the substrate that has been primed, for example treated with a conventional primer.

EXAMPLES

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention. Some of the characteristics of the ceramer compositions and the ceramers of the present invention were determined using Test Procedures described below.

Test Procedure 1: Surface Resistivity Test

Surface Resistivity measurements of ceramers were determined using an ETS Model 872 Wide Range Resistance Meter fitted with a Model 803B probe (commercially available from Electro-Tech Systems, Inc., Glenside, Pa.). Measurements were taken at ambient temperatures of 23±1° C. Two concentric ring electrodes were placed on the surface of the ceramer and an external voltage of 100 volts was applied across the surface of the ceramer. The wide range resistance meter measured the surface resistivity. The meter was able to measure surface resistivity readings that were in the range from $10^3$ to $10^{12}$ ohms/square with $6 \times 10^{13}$ ohms/square being the uppermost limit detectable by the apparatus. Ceramers having surface resisitivities of about $10^{12}$ ohms/square or less were considered to be antistatic coatings.

Test Procedure 2; Determination of Static Charge Dissipation Time

The static charge dissipation times of ceramers of the present invention were measured using an ETS Model 406C Static Decay Test Unit (commercially available from Electro-Tech Systems, Inc). This apparatus had deposited a charge, by a high voltage (5,000 volts) corona discharge, on the surface of a particular ceramer and the decay time of the surface voltage from 5,000 volts to 0 volts was measured by a fieldmeter. All reported values of the static charge dissipation time were calculated as the average of at least three separate static charge dissipation time determinations. Ceramers having a low static charge dissipation time characteristically have better antistatic properties than ceramers having a high static charge dissipation time.

Test Procedure 3: Determination of Abrasion Resistance

The abrasion resistance of a test sample was determined using a Taber Abraser, Model 503 (commercially available from Taber Co., Tonawanda, N.Y.). A test sample was placed on a rotating platform, with two weighted abrasive wheels rolling over the surface of the sample. Specifically, Taber CS-10F weighted abrasive wheels were used having a weight loading of approximately 500 grams/wheel. A vacuum was applied in the vicinity of the sample to remove residual debris formed during the test as a result of the abrasion process. The vacuum used was part of the Taber Abraser, Model 503, and the Taber Abraser Model 503 had a vacuum power setting which was set at 100 percent.

The abrasion resistance of a test sample was determined by monitoring the degree of haze formation in the abraded section of the sample as a function of the number of abrasive cycles. The haze was determined by use of ASTM Standard D-1003-95 "Standard Test Method for Haze and Luminous Transmittance of Transparent Plastics" using the method recommended in paragraph X2 "Alternative Haze (Short-Cut) Procedure". The instrument used to measure the haze of a sample, at ambient temperature (23±1° C.), was a Pacific Instruments Model XL211 Hazemeter (commercially available from Gardner Neotec Instrument Division, Silver Springs, Md.), equipped with an integrating sphere.

The abrasion resistance of the test sample is inversely correlated to the haze measurement determined using the procedure above. An abrasive article determined to have a high haze measured value will be less abrasion resistant than an article having a low haze measured value.

Example 1

Nine Acrylite FF acrylic sheets, commercially available from Cyro Industries, Rockaway, N.J., having a thickness of 3.1 mm were subjected to Test Procedures I, II, and III above. Surface resistivities were measured at 21 ° C. after equilibration at relative humidities of 21 percent, 28 percent, and 38 percent. The surface resistivities of all the sheets under all three relative humidity conditions were found to exceed $6 \times 10^{13}$ ohm/square. The charge dissipation times at the same relative humidity and temperature conditions were infinite, indicating that the samples were not antistatic. The observed percent haze change, as measured by Test Procedure III, was 19 percent after 100 abrasion cycles.

Example 2

Sheets of bare polyester film having a thickness of 175 micrometer, commercially available from ICI America, Wilmington, Del., under the trade name 505, were subjected to Test Procedures I, II, and III. The observed surface resistivities of these samples at 21° C. and relative humidities of 21 percent, 28 percent, and 38 percent all exceeded $6 \times 10^{13}$ ohm/square. Also, the charge dissipation times at the same temperature and humidity conditions were infinite. The observed percent haze change after 100 abrasion cycles conducted according to Test Procedure III was 22 percent.

Example 3

In a round-bottomed flask were mixed 1195 grams Nalco 2327 silica sol, commercially available from Nalco Chemical Co. (an ammonium ion-stabilized dispersion having a pH of 9.3 of colloidal silica particles, 40 percent solids, with an average particle diameter of 20 nanometers); 118 grams N,N-dimethyl acrylamide, commercially available from Aldrich Chemical Co; 120 grams 3-(trimethoxysilyl)propyl methacrylate coupling agent, commercially available from Aldrich Chemical Co.; and 761 grams pentaerythritol triacrylate, commercially available from Aldrich Chemical Co. The round-bottomed flask was subsequently mounted on the vacuum line of a Buchi R152 Rotavapor, commercially available from Buchi Laboratory AG, Flanil, Switzerland with the bath temperature set to 55° C. A refrigerated mixture of 50 percent deionized water/50 percent antifreeze, was recirculated through the cooling coils. Volatile components were removed at a reduced pressure of 25 Torr until the distillation rate was reduced to less than 5 drops per minute (approximately 2 hours.) The resulting material (1464 grams) was a clear liquid dispersion of acrylated silica particles in a mixture of N,N-dimethyl acrylamide and pentaerythritol triacrylate monomers (a ceramer composition). The Carl Fisher analysis of this ceramer composition indicated that the residual water in the composition is less than 1.5 percent by weight relative to the total weight of the composition.

Four parts of the above ceramer composition was added to 21 parts isopropanol and 0.14 part Irgacure 184 photoinitiator to form a 16 percent solids, crosslinkable clear ceramer composition in isopropanol. This dispersion was coated onto polyester sheets. Immediately after coating, the coated sheets were placed in a forced-air convection oven for 2.5 minutes at 67° C. to flash off the isopropanol. Next, the coated sheets were placed onto the conveyor belt of a UV Curing Station (Model MC-6RQN, commercially available from Fusion UV Curing Inc., Rockville, Md.) equipped with a Fusion "H" lamp. The resulting cured coatings on the polyester sheets were clear to the eye. The average percent haze of the coated sheets, measured according to Test Procedure 3 was 0.7 percent.

Samples of the cured coating were measured at 21 percent, 30 percent, and 38 percent relative humidity and their surface resistivity and discharge times measured according to Test Procedures 1 and 2. The surface resistivity for this example exceeded $6 \times 10^{13}$ ohms/square, at all three humidity levels, and the charge dissipation times were infinite. This indicates that the coating is not antistatic.

Example 4

Step 1: Ceramer Composition Preparation

In a round-bottomed flask were mixed 1195 grams Nalco 2327 silica sol, commercially available from Nalco Chemical Co. (an ammonium ion-stabilized dispersion having a pH of 9.3 of colloidal silica particles, 40 percent solids, with an average particle diameter of 20 nanometers); 118 grams N,N-dimethyl acrylamide, commercially available from Aldrich Chemical Co; 120 grams 3-(trimethoxysilyl)propyl methacrylate coupling agent, commercially available from Aldrich Chemical Co.; and 761 grams pentaerythritol triacrylate, commercially available from Aldrich Chemical Co. The round-bottomed flask was subsequently mounted on the vacuum line of a Buchi R152 Rotavapor, commercially available from Buchi Laboratory AG, with the bath temperature set to 55° C. A refrigerated mixture of 50 percent deionized water/50 percent antifreeze was recirculated through the cooling coils. Volatile components were removed at a reduced pressure of 25 Torr until the distillation rate was reduced to less than 5 drops per minute (approximately 2 hours.) The resulting material (1464 grams) was a clear liquid dispersion of acrylated silica particles in a mixture of N,N-dimethyl acrylamide and pentaerythritol triacrylate monomers (a ceramer composition).

Four grams of this ceramer composition was combined with 4 grams of isopropyl alcohol, 0.14 gram of Irgacure 184 photoinitiator, and 0.05 gram Dow-57 (surfactant, commercially available from Dow Chemical Company, Midland, Mich.) to make approximately a 50 percent solids mixture which shall be referred to as solution A for this example.

Step 2: Electrically Conductive Polymer Dispersion Preparation

In a separate vial, 1 gram of N,N-dimethyl acetamide, 2 grams of Bayer AI 4071 (1.3 weight percent mixture of 3,4-polyethylenedioxythiophene-polystyrenesulfonate conductive polymer dispersion in water) and 2 grams of acetone were mixed. The dispersion was shaken by hand to fully mix the samples. The resulting mixture shall be referred to as solution B for this example.

Step 3: Combination of Solutions and Final Coating Formation and Testing

Solution B was slowly poured into solution A, and the resulting mixture of approximately 22 percent solids was shaken by hand to mix. This mixture was subsequently coated onto acrylic substrates, and allowed to dry (to remove volatiles) at ambient conditions of approximately 30 percent relative humidity and 23±1° C. for 4 minutes and then was placed into a convection oven at approximately 67° C. for 4 minutes. Next, the coated sheets were placed onto the conveyor belt of a UV Curing Station (Model MC-6RQN, commercially available from Fusion UV Curing Inc.) equipped with a Fusion "H" lamp. The resulting cured coatings on the acrylic sheets were clear to the eye. The surface resistivity as measured by Test Procedure 1 was $5 \times 10^8$ ohms/square. The 5,000-volt discharge time was less than 0.01 seconds (the resolution of the instrument in Test Procedure 2.)

Example 5
Step 1: Ceramer Composition Preparation

In a round-bottomed flask were mixed 1195 grams Nalco 2327 silica sol, commercially available from Nalco Chemical Co (an ammonium ion-stabilized dispersion having a pH of 9.3 of colloidal silica particles, 40 percent solids with an average particle diameter of 20 nanometers), 118 grams N,N-dimethyl acrylamide, commercially available from Aldrich Chemical Co.; 120 grams 3-(trimethoxysilyl)propyl methacrylate coupling agent, commercially available from Aldrich Chemical Co.; and 761 grams pentaerythritol triacrylate, commercially available form Aldrich Chemical Co. The round-bottomed flask was subsequently mounted on the vacuum line of a Buchi R152 Rotavapor, commercially available from Buchi Laboratory AG, with the bath temperature set to 55° C. A refrigerated mixture of 50 percent deionized water and 50 percent antifreeze was recirculated through the cooling coils. Volatile components were removed at a reduced pressure of 25 Torr until the distillation rate was reduced to less than 5 drops per minute (approximately 2 hours.) The resulting material (1464 grams) was a clear liquid dispersion of acrylated silica particles in a mixture of N,N-dimethyl acrylamide and pentaerythritol triacrylate monomers (a ceramer composition).

Four grams of the above ceramer composition was combined with 4 grams of isopropyl alcohol, 0.14 gram of Irgacure 184 photoinitiator, and 0.1 gram Dow-57 (surfactant, commercially available from Dow Chemical Company) to make approximately a 50 percent solids mixture which shall be referred to as solution A for this example.

Step 2: Electrically Conductive Polymer Dispersion Preparation

In a separate vial, 1 gram of 1-vinyl-2-pyrrolidinone (an amide-containing compound), 2 grams of Bayer AI 4071 (1.3 weight percent mixture of 3,4-polyethylenedioxythiophene-polystyrenesulfonate conductive polymer dispersion in water), and 2 grams of acetone were mixed. The mixture was shaken by hand to thoroughly mix. The resulting mixture shall be referred to as solution B for this example.

Step 3: Combination of Solutions and Final Coating Formation and Testing

Solution B was slowly poured into solution A, and the resulting mixture, of approximately 22 percent solids, was shaken by hand to mix. This mixture was subsequently coated onto acrylic substrates, and allowed to dry (to remove volatiles) at ambient conditions of approximately 30 percent relative humidity and 23±1° C. for 4 minutes and then was placed into a convection oven at approximately 67° C. for 4 minutes. Next, the coated sheets were placed onto the conveyor belt of a UV Curing Station (Model MC-6RQN, commercially available from Fusion UV Curing Inc.) equipped with a Fusion "H" lamp. The resulting cured coatings on the acrylic sheets were clear to the eye. The surface resistivity as measured by Test Procedure I was $1 \times 10^6$ ohms/square. The 5,000-volt discharge time was less than 0.01 seconds.

Example 6
Step 1: Ceramer Composition Preparation

In a round-bottomed flask were mixed 1195 grams Nalco 2327 silica sol, commercially available from Nalco Chemical Co. (an ammonium ion-stabilized dispersion, having a pH of 9.3, of colloidal silica particles, 40 percent solids, with an average particle diameter of 20 nanometers), 118 grams N,N-dimethyl acrylamide, commercially available from Aldrich Chemical Co.; 120 grams 3-(trimethoxysilyl)propyl methacrylate coupling agent, commercially available from Aldrich Chemical Co; and 761 grams pentaerythritol triacrylate, commercially available from Aldrich Chemical Co. The round-bottomed flask was subsequently mounted on the vacuum line of a Buchi R152 Rotavapor, commercially available from Buchi Laboratory AG, with the bath temperature set to 55° C. A refrigerated mixture of 50 percent deionized water/50 percent antifreeze was recirculated through the cooling coils. Volatile components were removed at a reduced pressure of 25 Torr until the distillation rate was reduced to less than 5 drops per minute (approximately 2 hours.) The resulting material (1464 grams) was a clear liquid dispersion of acrylated silica particles in a mixture of N,N-dimethyl acrylamide and pentaerythritol triacrylate monomers (a ceramer composition).

Four grams of the above ceramer composition was combined with 4 grams of isopropyl alcohol, 0.14 gram of Irgacure 184 photoinitiator, and 0.1 gram Dow-57 (surfactant, commercially available from Dow Chemical Company) to make approximately a 50 percent solids mixture which shall be referred to as solution A for this example.

Step 2: Electrically Conductive Polymer Dispersion Preparation

In a separate vial, 1 gram of N,N-dimethyl acrylamide (an amide-containing entity), 2 grams of Bayer AI 4071 (1.3 weight percent mixture of 3,4-polyethylenedioxythiophene-polystyrenesulfonate conductive polymer dispersion in water), and 2 grams of acetone were mixed. The mixture was shaken by hand to thoroughly mix. The resulting mixture shall be referred to as solution B for this example.

Step 3: Combination of Solutions and Final Coating Formation and Testing

Solution B was slowly poured into solution A, and the resulting mixture of approximately 22 percent solids was shaken by hand to mix. This mixture was subsequently coated onto acrylic substrates, and allowed to dry (to remove volatiles) at ambient conditions of approximately 30 percent relative humidity and 23±1° C. for 4 minutes and then was placed into a convection oven at approximately 67° C. for 4 minutes. Next, the coated sheets were placed onto the conveyor belt of a UV Curing Station (Model MC-6RQN, commercially available from Fusion UV Curing Inc.) equipped with a Fusion "H" lamp. The resulting cured coatings on the acrylic sheets were clear to the eye. The surface resistivity as measured by Test Procedure 1 was $2 \times 10^8$ ohms/square. The 5,000-volt discharge time was less than 0.01 seconds.

Example 7
Step 1: Ceramer Composition Preparation

In a round-bottomed flask were mixed 1195 grams Nalco 2327 silica sol, commercially available from Nalco Chemical Co. (an ammonium ion-stabilized dispersion, having a pH of 9.3, of colloidal silica particles, 40 percent solids, with an average particle diameter of 20 nanometers), 118 grams N,N-dimethyl acrylamide, commercially available from Aldrich Chemical Co.; 120 grams 3-(trimethoxysilyl)propyl methacrylate coupling agent, commercially available from Aldrich Chemical Co.; and 761 grams pentaerythritol triacrylate, commercially available from Aldrich Chemical Co. The round-bottomed flask was subsequently mounted on the vacuum line of a Buchi R152 Rotavapor, commercially available from Buchi Laboratory AG, with the bath temperature set to 55° C. A refrigerated mixture of 50 percent deionized water/50 percent antifreeze was recirculated through the cooling coils. Volatile components were removed at a reduced pressure of 25 Torr until the distillation rate was reduced to less than 5 drops per minute (approximately 2 hours.) The resulting material (1464 grams) was a clear liquid dispersion of acrylated silica particles in a mixture of N,N-dimethyl acrylamide and pentaerythritol triacrylate monomers (a ceramer composition).

Two grams of the above ceramer composition was combined with 2 grams of isopropyl alcohol and 0.07 gram of Irgacure 184 photoinitiator to make approximately a 50 percent solids mixture which shall be referred to as solution A for this example. Step 2: Electrically Conductive Polymer Dispersion Preparation In a separate vial, 2 grams of N-methyl-pyrrolidinone, 1 gram of Bayer AI 4071 (1.3 weight percent mixture of 3,4-polyethylenedioxythiophene-polystyrenesulfonate conductive polymer dispersion in water), and 5 grams of acetone were mixed. The mixture was shaken by hand to fully mix. The resulting mixture shall be referred to as solution B for this example.

Step 3: Combination of Solutions and Final Coating Formation and Testing

Solution B was slowly poured into solution A, and the resulting mixture of approximately 16.7 percent solids was shaken by hand to mix. This mixture was subsequently coated onto acrylic substrates, and allowed to dry (to remove volatiles) at ambient conditions of approximately 40 percent relative humidity and 23±1° C. for 4 minutes and then was placed into a convection oven at approximately 67° C. for 4 minutes. Next, the coated sheets were placed onto the conveyor belt of a UV Curing Station (Model MC-6RQN, commercially available from Fusion UV Curing Inc.) equipped with a Fusion "H" lamp. The resulting cured coatings on the acrylic sheets were slightly hazy to clear to the eye. The surface resistivity as measured by Test Procedure I was $5 \times 10^8$ ohms/square. The 5,000-volt discharge time was less than 0.01 seconds.

Example 8

Step 1: Ceramer Composition Preparation

In a round-bottomed flask were mixed 1195 grams Nalco 2327 silica sol, commercially available from Nalco Chemical Co. (an ammonium ion-stabilized dispersion, having a pH of 9.3, of colloidal silica particles, 40 percent solids, with an average particle diameter of 20 nanometers), 118 grams N,N-dimethyl acrylamide, commercially available from Aldrich Chemical Co.; 120 grams 3-(trimethoxysilyl)propyl methacrylate coupling agent, commercially available from Aldrich Chemical Co.; and 761 grams pentaerythritol triacrylate, commercially available from Aldrich Chemical Co. The round-bottomed flask was subsequently mounted on the vacuum line of a Buchi R152 Rotavapor, commercially available from Buchi Laboratory AG, with the bath temperature set to 55° C. A refrigerated mixture of 50 percent deionized water/50 percent antifreeze was recirculated through the cooling coils. Volatile components were removed at a reduced pressure of 25 Torr until the distillation rate was reduced to less than 5 drops per minute (approximately 2 hours.) The resulting material (1464 grams) was a clear liquid dispersion of acrylated silica particles in a mixture of N,N-dimethyl acrylamide and pentaerythritol triacrylate monomers (a ceramer composition).

Two grams of the above ceramer composition was combined with 2 grams of isopropyl alcohol and 0.07 gram of Irgacure 184 photoinitiator to make approximately a 50 percent solids mixture which shall be referred to as solution A for this example.

Step 2: Electrically Conductive Polymer Dispersion Preparation

In a separate vial, 8 grams of a 50 weight percent solution of N-vinyl caprolactam (an amide-containing compound) in isopropanol, 2 grams of Bayer AI 4071 (1.3 weight percent mixture of 3,4-polyethylenedioxythiophene-polystyrenesulfonate conductive polymer dispersion in water), 4 grams of 1-methoxy-2-propanol, and 4 grams of acetone were mixed. The Bayer AI 4071 dispersion was added dropwise to the solution of N-vinyl caprolactam first, and then the other solvents were added subsequently. The resulting mixture shall be referred to as solution B for this example.

Step 3: Combination of Solutions and Final Coating Formation and Testing

Solution B was slowly poured into solution A, and the resulting mixture of approximately 27 percent solids was shaken by hand to mix. This mixture was subsequently coated onto acrylic substrates, and allowed to dry (to remove isopropyl alcohol and acetone) at ambient conditions of approximately 30 percent relative humidity and 23±1° C. for 4 minutes and then was placed into a convection oven at approximately 67° C. for 4 minutes. Next, the coated sheets were placed onto the conveyor belt of a UV Curing Station (Model MC-6RQN, commercially available from Fusion UV Curing Inc.) equipped with a Fusion "H" lamp. The resulting cured coatings on the acrylic sheets were clear to the eye. The surface resistivity as measured by Test Procedure I was $1 \times 10^8$ ohms/square. The 5,000-volt discharge time was less than 0.01 seconds.

Example 9

Step 1: Ceramer Composition Preparation

In a round-bottomed flask were mixed 1195 grams Nalco 2327 silica sol, commercially available from Nalco Chemical Co. (an ammonium ion-stabilized dispersion, having a pH of 9.3, of colloidal silica particles, 40 percent solids, with an average particle diameter of 20 nanometers), 118 grams N,N-dimethyl acrylamide, commercially available from Aldrich Chemical Co.; 120 grams 3-(trimethoxysilyl)propyl methacrylate coupling agent, commercially available from Aldrich Chemical Co.; and 761 grams pentaerythritol triacrylate, commercially available from Aldrich Chemical Co. The round-bottomed flask was subsequently mounted on the vacuum line of a Buchi R152 Rotavapor, commercially available from Buchi Laboratory AG, with the bath temperature set to 55° C. A refrigerated mixture of 50 percent deionized water/50 percent antifreeze was recirculated through the cooling coils. Volatile components were removed at a reduced pressure of 25 Torr until the distillation rate was reduced to less than 5 drops per minute (approximately 2 hours.) The resulting material (1464 grams) was a clear liquid dispersion of acrylated silica particles in a mixture of N,N-dimethyl acrylamide and pentaerythritol triacrylate monomers (a ceramer composition).

Two grams of the above ceramer composition was combined with 2 grams of isopropyl alcohol and 0.07 gram of Irgacure 184 photoinitiator to make approximately a 50 percent solids mixture which shall be referred to as solution A for this example.

Step 2: Electrically Conductive Polymer Dispersion Preparation

In a separate vial, 2 grams of N-vinyl formamide (an amide-containing compound), 1 gram of Bayer AI 4071 (1.3 weight percent mixture of 3,4-polyethylenedioxythiophene-polystyrenesulfonate conductive polymer dispersion in water), and 4 grams of 1-methyl-2-propanol were mixed.

The dispersion was shaken by hand to thoroughly mix. The resulting mixture shall be referred to as solution B for this example.

Step 3: Combination of Solutions and Final Coating Formation and Testing

Solution B was slowly poured into solution A, and the resulting mixture of approximately 36 percent solids was shaken by hand to mix. This mixture was subsequently coated onto acrylic substrates, and allowed to dry (to remove isopropyl alcohol, and acetone) at ambient conditions of approximately 30 percent relative humidity and 23±1° C. for 4 minutes and then was placed into a convection oven at approximately 67° C. for 4 minutes. Next, the coated sheets were placed onto the conveyor belt of a UV Curing Station (Model MC-6RQN, commercially available from Fusion UV Curing Inc.) equipped with a Fusion "H" lamp. The resulting cured coatings on the acrylic sheets were slightly hazy to clear to the eye. The surface resistivity as measured by Test Procedure I was $2.5 \times 10^8$ ohms/square. The 5,000-volt discharge time was less than 0.01 seconds.

Example 10

Step 1: Ceramer Composition Preparation

In a round-bottomed flask were mixed 1195 grams Nalco 2327 silica sol, commercially available from Nalco Chemical Co. (an ammonium ion-stabilized dispersion, having a pH of 9.3, of colloidal silica particles, 40 percent solids, with an average particle diameter of 20 nanometers), 118 grams N,N-dimethyl acrylamide, commercially available from Aldrich Chemical Co.; 120 grams 3-(trimethoxysilyl)propyl methacrylate coupling agent, commercially available from Aldrich Chemical Co.; and 761 grams pentaerythritol triacrylate, commercially available from Aldrich Chemical Co. The round-bottomed flask was subsequently mounted on the vacuum line of a Buchi R152 Rotavapor, commercially available from Buchi Laboratory AG, with the bath temperature set to 55° C. A refrigerated mixture of 50 percent deionized water/50 percent antifreeze was recirculated through the cooling coils. Volatile components were removed at a reduced pressure of 25 Torr until the distillation rate was reduced to less than 5 drops per minute (approximately 2 hours.) The resulting material (1464 grams) was a clear liquid dispersion of acrylated silica particles in a mixture of N,N-dimethyl acrylamide and pentaerythritol triacrylate monomers (a ceramer composition).

Four grams of the above ceramer composition was combined with 4 grams of isopropyl alcohol and 0.14 gram of Irgacure 184 photoinitiator to make approximately a 50 percent solids mixture which shall be referred to as solution A for this example.

Step 2: Electrically Conductive Polymer Dispersion Preparation

In a separate vial, 13 grams of N,N-dimethyl acetamide (an amide-containing compound) and 2 grams of Bayer AI 4071 (1.3 weight percent mixture of 3,4-polyethylenedioxythiophene-polystyrenesulfonate conductive polymer dispersion in water) were mixed. The resulting dispersion was shaken by hand to thoroughly mix. This mixture shall be referred to as solution B for this example.

Step 3: Combination of Solutions and Final Coating Formation and Testing

Solution B was slowly poured into solution A, and the resulting mixture of approximately 17 percent solids was shaken by hand to mix. This mixture was subsequently coated onto acrylic substrates, and allowed to dry (to remove volatiles) at ambient conditions of approximately 30 percent relative humidity and 23±1° C. for 4 minutes and then was placed into a convection oven at approximately 67° C. for 4 minutes. Next, the coated sheets were placed onto the conveyor belt of a UV Curing Station (Model MC-6RQN, commercially available from Fusion UV Curing Inc.) equipped with a Fusion "H" lamp. The resulting cured coatings on the acrylic sheets were clear to the eye. The surface resistivity as measured by Test Procedure I was $2 \times 10^8$ ohms/square. The 5,000-volt discharge time was 0.01 seconds.

Example 11

Step 1: Ceramer Composition Preparation

In a round-bottomed flask were mixed 1195 grams Nalco 2327 silica sol, commercially available from Nalco Chemical Co. (an ammonium ion-stabilized dispersion, having a pH of 9.3, of colloidal silica particles, 40 percent solids, with an average particle diameter of 20 nanometers), 118 grams N,N-dimethyl acrylamide, commercially available from Aldrich Chemical Co.; 120 grams 3-(trimethoxysilyl)propyl methacrylate coupling agent, commercially available from Aldrich Chemical Co.; and 761 grams pentaerythritol triacrylate, commercially available from Aldrich Chemical Co. The round-bottomed flask was subsequently mounted on the vacuum line of a Buchi R152 Rotavapor, commercially available from Buchi Laboratory AG, with the bath temperature set to 55° C. A refrigerated mixture of 50 percent deionized water/50 percent antifreeze, was recirculated through the cooling coils. Volatile components were removed at a reduced pressure of 25 Torr until the distillation rate was reduced to less than 5 drops per minute (approximately 2 hours.) The resulting material (1464 grams) was a clear liquid dispersion of acrylated silica particles in a mixture of N,N-dimethyl acrylamide and pentaerythritol triacrylate monomers (a ceramer composition).

Four grams of the above ceramer composition was combined with 4 grams of isopropyl alcohol and 0.14 gram of Irgacure 184 photoinitiator to make approximately a 50 percent solids mixture which shall be referred to as solution A for this example.

Step 2: Electrically Conductive Polymer Dispersion Preparation

In a separate vial, 2 grams of N,N-dimethyl acetamide (an amide-containing compound), 2 grams of a 20 weight percent polypyrrole solution (ConQuest XP 1000 polypyrrole/polyurethane dispersion in water, commercially available from DSM Co.), and 2 grams of acetone were mixed. The mixture was shaken by hand to thoroughly mix. The resulting mixture shall be referred to as solution B for this example.

Step 3: Combination of Solutions and Final Coating Formation and Testing

Solution B was slowly poured into solution A, and the resulting mixture of approximately 31 percent solids was shaken by hand to mix. This mixture was subsequently coated onto acrylic substrates, and allowed to dry (to remove volatiles) at ambient conditions of approximately 30 percent relative humidity and 23±1° C. for 4 minutes and then was placed into a convection oven at approximately 67° C. for 4 minutes. Next, the coated sheets were placed onto the conveyor belt of a UV Curing Station (Model MC-6RQN, commercially available from Fusion UV Curing Inc.) equipped with a Fusion "H" lamp. The resulting cured coatings on the acrylic sheets were very dark grey/black to translucent (non-transparent) to the eye. The surface resistivity as measured by Test Procedure I was $5 \times 10^6$ ohms/square. The 5,000-volt discharge time was less than 0.01 seconds (the resolution of the instrument in Test Procedure 2).

Example 12

Step 1: Ceramer Composition Preparation

In a round-bottomed flask were mixed 1195 grams Nalco 2327 silica sol, commercially available from Nalco Chemical Co. (an ammonium ion-stabilized dispersion, having a pH of 9.3, of colloidal silica particles, 40 percent solids, with an average particle diameter of 20 nanometers), 118 grams N,N-dimethyl acrylamide, commercially available from Aldrich Chemical Co.); 120 grams 3-(trimethoxysilyl) propyl methacrylate coupling agent, commercially available from Aldrich Chemical Company; and 761 grams pentaerythritol triacrylate, commercially available from Aldrich Chemical Company. The round-bottomed flask was subsequently mounted on the vacuum line of a Buchi R152 Rotavapor, commercially available from Buchi Laboratory AG, with the bath temperature set to 55° C. A refrigerated mixture of 50 percent deionized water/50 percent antifreeze was recirculated through the cooling coils. Volatile components were removed at a reduced pressure of 25 Torr until the distillation rate was reduced to less than 5 drops per minute (approximately 2 hours.) The resulting material (1464 grams) was a clear liquid dispersion of acrylated silica particles in a mixture of N,N-dimethyl acrylamide and pentaerythritol triacrylate monomers (a ceramer composition).

Four grams of the above ceramer composition was combined with 4 grams of isopropyl alcohol and 0.14 gram of Irgacure 184 photoinitiator to make approximately a 50 percent solids mixture which shall be referred to as solution A for this example.

Step 2: Electrically Conductive Polymer Dispersion Preparation

In a separate vial, 2 grams of N,N-dimethyl acetamide (an amide-containing compound), 2 grams of a 50 weight percent polyaniline solution (polyaniline conductive polymer 5927657, 50 weight percent) and 2 grams of acetone were mixed. The mixture was shaken by hand to thoroughly mix. The resulting mixture shall be referred to as solution B for this example.

Step 3: Combination of Solutions and Final Coating Formation and Testing

Solution B was slowly poured into solution A, and the resulting mixture of approximately 35.7 percent solids was shaken by hand to mix. This mixture was subsequently coated onto acrylic substrates, and allowed to dry (to remove volatiles) at ambient conditions of approximately 30 percent relative humidity and 23±1° C. for 4 minutes and then was placed into a convection oven at approximately 67° C. for 4 minutes. Next, the coated sheets were placed onto the conveyor belt of a UV Curing Station (Model MC-6RQN, commercially available from Fusion UV Curing Inc.) equipped with a Fusion "H" lamp. The resulting cured coatings on the acrylic sheets were very dark green to translucent (non-transparent) to the eye. The surface resistivity as measured by Test Procedure I was $1 \times 10^7$ ohms/square. The 5,000-volt discharge time was less than 0.01 seconds (the resolution of the instrument in Test Procedure 2).

Example 13

Step 1: Binder Precursor Mixing (no silica)

In a glass vial, the following materials were mixed: 2 grams of pentaerythritol triacrylate and 2 grams of isopropyl alcohol. For this example, this mixture shall be referred to as solution A.

Step 2: Electrically Conductive Polymer Dispersion Preparation

In a separate glass vial, 5 grams of N,N-dimethyl acetamide and 1 gram of Bayer AI 4071 (1.3 weight percent mixture of 3,4-polyethylenedioxythiophene-polystyrenesulfonate conductive polymer dispersion in water) were mixed together. For this example, this mixture shall be referred to as solution B.

Step 3: Combination of Solutions and Final Coating Formation and Testing

Solution B was slowly poured into solution A, and the resulting mixture of approximately 20 percent solids was shaken by hand to mix. This mixture was subsequently coated onto acrylic substrates, and allowed to dry (to remove volatiles) at ambient conditions of approximately 30 percent relative humidity and 23±1° C. for 4 minutes and then was placed into a convection oven at approximately 67° C. for 4 minutes. The resulting dried coatings on the acrylic sheets did not form a uniform, transparent layer, but instead phase separated into small regimes of high and low concentrations of conductive polymer. These regions appeared as dark blue spots (high concentration of conductive polymer) surrounded by clear regions (low conductive polymer content) in the final coating. This demonstrates that silica particles (seen in all previous examples) are necessary for uniform distribution of conductive polymer on drying of the coatings. Surface resistivity measurements and discharge times were not measured.

Example 14

Step 1: Ceramer Composition Preparation

In a round-bottomed flask were mixed 1195 grams Nalco 2327 silica sol, commercially available from Nalco Chemical Co. (an ammonium ion-stabilized dispersion, having a pH of 9.3, of colloidal silica particles, 40 percent solids, with an average particle diameter of 20 nanometers), 118 grams N,N-dimethyl acrylamide, commercially available from Aldrich Chemical Co.; 120 grams 3-(trimethoxysilyl)propyl methacrylate coupling agent, commercially available from Aldrich Chemical Co.; and 761 grams pentaerythritol triacrylate, commercially available from Aldrich Chemical Co. The round-bottomed flask was subsequently mounted on the vacuum line of a Buchi R152 Rotavapor, commercially available from Buchi Laboratory AG, with the bath temperature set to 55° C. A refrigerated mixture of 50 percent deionized water/50 percent antifreeze was recirculated through the cooling coils. Volatile components were removed at a reduced pressure of 25 Torr until the distillation rate was reduced to less than 5 drops per minute (approximately 2 hours.) The resulting material (1464 grams) was a clear liquid dispersion of acrylated silica particles in a mixture of N,N-dimethyl acrylamide and pentaerythritol triacrylate monomers (a ceramer composition).

Four grams of the ceramer composition above was combined with 4 grams of isopropyl alcohol and 0.14 gram of Irgacure 184 photoinitiator to make approximately a 50 percent solids mixture which shall be referred to as solution A for this example.

Step 2: Electrically Conductive Polymer Dispersion Preparation

In a separate vial, 1 gram of isopropyl alcohol, 1 gram of methyl ethyl ketone, and 2 grams of Bayer AI 4071 (1.3 weight percent mixture of 3,4-polyethylenedioxythiophene-polystyrenesulfonate conductive polymer dispersion in water) were mixed. This resulting dispersion was shaken by hand to mix. Some evidence of small polythiophene agglomerate formation was seen. The resulting mixture shall be referred to as solution B for this example.

Step 3: Combination of Solutions and Final Coating Formation and Testing

Solution B was slowly poured into solution A, and the resulting mixture of approximately 33 percent solids was shaken by hand to mix. This mixture was subsequently coated onto acrylic substrates, and allowed to dry (to remove isopropyl alcohol and acetone) at ambient conditions of approximately 30 percent relative humidity and 23±1° C. for 4 minutes and then was placed into a convection oven at approximately 67° C. for 4 minutes. Next, the coated sheets were placed onto the conveyor belt of a UV Curing Station (Model MC-6RQN, commercially available from Fusion UV Curing Inc.) equipped with a Fusion "H" lamp. The resulting cured coatings on the acrylic sheets contained small agglomerates of polythiophene and significant quantities of pinholes in the surface. The surface resistivity and discharge times were not measured.

Example 15
Step 1: Ceramer Composition Preparation

The following materials were charged into a 500 milliliters round-bottom flask: 67.15 grams Nalco 1042 silica sol, commercially available from Nalco Chemical Co. (an aqueous acidic dispersion 34 percent solids, pH=3.2, of colloidal silica particles), 11.2 grams 2-hydroxyethyl acrylate, commercially available from Aldrich Chemical Co.; 5.6 grams 3-(trimethoxysilyl)propyl methacrylate, commercially available from Dow Corning, under the trade name Z6030); and 7.9 grams pentaerythritol acrylate, commercially available from Aldrich Chemical Co. The flask was then attached to a Buchi R110 rotary evaporator and the water extracted under vacuum (about 80 mm Hg) at a water bath temperature of 55° C. The resulting liquid ceramer composition was clear and contained less than 2 percent water as determined by the Carl Fisher analysis method.

Two grams of the above ceramer composition were combined with 2 grams of isopropyl alcohol, 0.14 gram of Irgacure 184 photoinitiator, and 0.05 gram Dow-57 (surfactant, commercially available from Dow Chemical Company) to make approximately a 50 percent solids mixture which shall be referred to as solution A for this example.
Step 2: Electrically Conductive Polymer Dispersion Preparation In a separate vial, 2 grams of N,N-dimethyl acetamide (an amide-containing compound), 1 gram of Bayer AI 4071 (1.3 weight percent mixture of 3,4-polyethylenedioxythiophene-polystyrenesulfonate conductive polymer dispersion in water) were added together. The mixture was shaken by hand to thoroughly mix. The resulting mixture shall be referred to as solution B for this example.
Step 3: Combination of Solutions and Final Coating Formation and Testing To solution A was added 4.76 grams of ethyl alcohol. After this was mixed, solution B was added to the mixture of solution A and ethyl alcohol. This mixture was subsequently coated onto acrylic substrates, and allowed to dry (to remove volatiles) at ambient conditions of approximately 30 percent relative humidity and 23±1° C. for 4 minutes and then was placed into a convection oven at approximately 67° C. for 4 minutes. Next, the coated sheets were placed onto the conveyor belt of a UV Curing Station (Model MC-6RQN, commercially available from Fusion UV Curing Inc.) equipped with a Fusion "H" lamp. The resulting cured coatings on the acrylic sheets were clear to the eye. The surface resistivity as measured by Test Procedure I was $3\times10^8$ ohms/square. The 5,000-volt discharge time was less than 0.01 seconds (the resolution of the instrument in Test Procedure II).

Example 16
Step 1: Ceramer Composition Preparation

In a 500 milliliter round-bottom flask were mixed the following materials: 119.5 grams Nalco 2327 silica sol, 62 grams 2-hydroxyethyl acrylate, 43 grams tetraethylene glycol diacrylate (commercially available from Aldrich Chemical Co.), and 12 grams 3-(methacryloxypropyl) trimethoxysilane coupling agent. The flask was then attached to a Buchi R-110 rotary evaporator and heated for 10 minutes in the water bath prior to application of vacuum. The water was then extracted from the mixture at 75 Torr and 60° C. until no further water droplets were collected in the condenser. The resulting liquid ceramer composition was clear and contained 29.7 percent by weight silica and 70.3 percent by weight organic phase.

Two grams of the above mixture was combined with 2 grams of isopropyl alcohol, 0.07 grams of Irgacure 184 photoinitiator, and 4.76 grams of ethyl alcohol to make a mixture that shall be called solution A for this example.
Step 2: Electrically Conductive Polymer Dispersion Preparation In a separate vial, 2 grams of N,N-dimethyl acetamide (an amide-containing compound) and 1 gram of Bayer AI 4071 (1.3 weight percent mixture of 3,4-polyethylenedioxythiophene-polystyrenesulfonate conductive polymer dispersion in water) were added together. The mixture was shaken by hand to thoroughly mix. The resulting mixture shall be referred to as solution B for this example.
Step 3: Combination of Solutions and Final Coating Formation and Testing Solution B was slowly poured into solution A, and the resulting mixture of approximately 17 percent solids was shaken by hand to mix. This mixture was subsequently coated onto acrylic substrates, and allowed to dry (to remove isopropyl alcohol and acetone) at ambient conditions of approximately 30 percent relative humidity and 23±1° C. for 4 minutes and then was placed into a convection oven at approximately 67° C. for 4 minutes. Next, the coated sheets were placed onto the conveyor belt of a UV Curing Station (Model MC-6RQN, commercially available from Fusion UV Curing Inc.) equipped with a Fusion "H" lamp. The resulting cured coatings on the acrylic sheets were clear to the eye. The surface resistivity of the resulting coatings was measured to be $3\times10^7$ ohms/square, and discharge times were less than 0.01 seconds.

Example 17
Step 1: Ceramer Composition Preparation

In a round-bottomed flask were mixed 1195 grams Nalco 2327 silica sol, commercially available from Nalco Chemical Co. (an ammonium ion-stabilized dispersion, having a pH of 9.3, of colloidal silica particles, 40 percent solids, with an average particle diameter of 20 nanometers); 118 grams N,N-dimethyl acrylamide, commercially available from Aldrich Chemical Co.; 120 grams 3-(trimethoxysilyl)propyl methacrylate coupling agent, commercially available from Aldrich Chemical Co.; and 761 grams pentaerythritol triacrylate, commercially available from Aldrich Chemical Co. The round-bottomed flask was subsequently mounted on the vacuum line of a Buchi R152 Rotavapor, commercially available from Buchi Laboratory AG, with the bath temperature set to 55° C. A refrigerated mixture of 50 percent deionized water/50 percent antifreeze was recirculated through the cooling coils. Volatile components were removed at a reduced pressure of 25 Torr until the distillation rate was reduced to less than 5 drops per minute (approximately 2 hours.) The resulting material (1464 grams) was a clear liquid dispersion of acrylated silica particles in a mixture of N,N-dimethyl acrylamide and pentaerythritol triacrylate monomers (a ceramer composition).

Eight grams of the above ceramer composition was combined with 8 grams of isopropyl alcohol, 0.28 gram of Irgacure 184 photoinitiator, 3 grams of 1-methoxy-2-propanol, and 17 grams of methyl ethyl ketone to make approximately a 22 percent solids mixture which shall be referred to as solution A for this example.

Step 2: Electrically Conductive Polymer Dispersion Preparation

In a separate vial, 8 grams of N,N-dimethyl acetamide and 4 grams of Bayer AI 4071 (1.3 weight percent mixture of 3,4-polyethylenedioxythiophene-polystyrenesulfonate conductive polymer dispersion in water) were mixed. The dispersion was shaken by hand to fully mix the samples. The resulting mixture shall be referred to as solution B for this example.

Step 3: Combination of Solutions and Final Coating Formation and Testing

Solution B was slowly poured into solution A and the resulting mixture of approximately 16.7 percent solids was shaken by hand to mix. This mixture was subsequently coated onto polyester film substrates, and allowed to dry (to remove volatiles) at ambient conditions of approximately 23 percent relative humidity and 23±1° C. for 4 minutes and then was placed into a convection oven at approximately 67° C. for 4 minutes. Next, the coated films were placed onto the conveyor belt of a UV Curing Station (Model MC-6RQN, commercially available from Fusion UV Curing Inc.) equipped with a Fusion "H" lamp. The resulting cured coatings on the polyester films were clear to the eye.

Step 4: Taber Abrasion Testing

The ceramer of Example 17 was tested for abrasion resistance according to Test Procedure 3 outlined previously. The results (two to three samples were averaged per point) are illustrated in Table 1.

TABLE 1

| Taber Cycles | Average Percent Haze (%) |
| --- | --- |
| 0 | 0.85 |
| 100 | 1.65 |
| 200 | 2.0 |
| 300 | 2.6 |
| 400 | 2.7 |
| 500 | 3.1 |

Example 18

Step 1: Ceramer Composition Preparation

In a glass vial were mixed 0.85 gram of pentaerythritol triacrylate, commercially available from Aldrich Chemical Co.; 3 grams of ethyl alcohol and 0.15 gram of fumed silica (OX-50). This mixture was mixed by hand and then placed in an ultrasonic bath for 30 minutes. Following this, 0.07 gram of Irgacure 184 and 1 drop of 50 percent Dow-57 (surfactant, commercially available from Dow Chemical Company) in isopropyl alcohol were added. The resulting mixture was clear, but had evidence of silica agglomerates within the sol. This mixture shall be referred to as solution A for the remainder of this example.

Step 2: Electrically Conductive Polymer Dispersion Preparation

In a separate vial were mixed 1 gram of Bayer AI 4071 (1.3 weight percent mixture of 3,4-polyethylenedioxythiophene-polystyrenesulfonate conductive polymer dispersion in water) and 1 gram of N,N-dimethyl acetamide, commercially available from Aldrich Chemical Co. The resulting mixture shall be referred to as solution B for the remainder of this example.

Step 3: Combination of Solutions and Final Coating Formation and Testing

Solution B was slowly poured into solution A, and the resulting mixture of approximately 20 percent solids was shaken by hand to mix. This mixture was subsequently coated onto acrylic substrates, and allowed to dry (to remove volatiles) in a convection oven at approximately 67° C. for 4 minutes. Next, the coated films were placed onto the conveyor belt of a UV Curing Station (Model MC-6RQN, commercially available from Fusion UV Curing Inc.) equipped with a Fusion "H" lamp. The resulting cured coatings on the acrylic sheet were severely phase separated, visually opaque, and very rough on the surface. Surface resistivity was measured at $3 \times 10^7$ ohms/square, and discharge times were less than 0.01 seconds.

Example 19

Step 1: Ceramer Composition Preparation

In a round-bottom flask were mixed 60 grams of Nalco 2327 silica sol and 47.6 grams N,N dimethyl acrylamide. The homogeneous mixture was brought to 55° C. and its water content stripped in a Buchi R110 rotavapor. To the dehydrated mixture was then added 10 grams of pentaerythritol acrylate. The resulting liquid ceramer was clear. It contained 30 percent by weight silica, 58 percent N,N dimethylacrylamide and 12 percent pentaerythritol acrylate. Two grams of this mixture was diluted with 6 grams of ethanol. This mixture of alcohol and ceramer shall be termed solution A for the purposes of this example.

Step 2: Electrically Conductive Polymer Dispersion Preparation

In a small glass vial were mixed 1 gram of N,N-dimethylacetamide and 1 gram Bayer AI 4071 (1.3 weight percent mixture of 3,4-polyethylenedioxythiophene-polystyrenesulfonate conductive polymer dispersion in water). The resulting mixture shall be referred to as solution B for the purposes of this example.

Step 3: Combination of Solutions and Final Coating Formation and Testing

Solution B was slowly poured into solution A, and the resulting mixture of approximately 20 percent solids was shaken by hand to mix. This mixture was subsequently coated onto acrylic substrates, and allowed to dry (to remove volatiles) in a convection oven at approximately 67° C. for 4 minutes. Next, the coated films were placed onto the conveyor belt of a UV Curing Station (Model MC-6RQN, commercially available from Fusion UV Curing Inc.) equipped with a Fusion "H" lamp. The resulting cured coatings on the acrylic sheet were clear to the eye with a smooth surface finish. Surface resistivity was measured at $2 \times 10^8$ ohms/square and discharge times were less than 0.01 seconds.

Example 20

Step 1: Ceramer Preparation

In a glass vial were mixed 1.7 grams of pentaerythritol triacrylate, commercially available from Aldrich Chemical Co., and 0.3 gram of a silane-treated silica powder commercially available from the Minnesota Mining and Manufacturing Company (OX-50 silica powder treated with 3-(trimethoxysilyl)propyl methacrylate coupling agent). This mixture was diluted with 6 grams of ethyl alcohol. The resulting mixture shall be termed solution A for the purposes of this example.

Step 2: Electrically Conductive Polymer Dispersion Preparation

In a small glass vial were mixed 1 gram of N,N-dimethylacetamide and 1 gram Bayer AI 4071 (1.3 weight percent mixture of 3,4-polyethylenedioxythiophene-polystyrenesulfonate conductive polymer dispersion in water). The resulting mixture shall be referred to as solution B for the purposes of this example.

Step 3: Combination of Solutions and Final Coating Formation and Testing

Solution B was slowly poured into solution A, and the resulting mixture of approximately 20 percent solids was shaken by hand to mix. This mixture was subsequently coated onto acrylic substrates, and allowed to dry (to remove volatiles) in a convection oven at approximately 67° C. for 4 minutes. Next, the coated films were placed onto the conveyor belt of a UV Curing Station (Model MC-6RQN, commercially available from Fusion UV Curing Inc.) equipped with a Fusion "H" lamp. The resulting cured coatings on the acrylic sheet were translucent to the eye, with a rough surface finish. Surface resistivity was measured at $2 \times 10^8$ ohms/square, and discharge times were less than 0.01 seconds.

The complete disclosure of all patents, patent documents, and publications cited herein are incorporate by reference. The foregoing detailed description and examples have been given for clarity of understanding only. No unnecessary limitations are to be understood therefrom. The invention is not limited to the exact details shown and described for variations obvious to one skilled in the art will be included within the invention defined by the claims.

What is claimed is:

1. A ceramer composition comprising:
   a plurality of colloidal silica particles;
   a binder precursor;
   a dispersion of an electrically conductive organic polymer; and
   an amide containing compound.

2. The ceramer composition of claim 1, further comprising a curing agent.

3. The ceramer composition of claim 1, further comprising a coupling agent.

4. The ceramer composition of claim 3, wherein the coupling agent is selected from the group consisting of monofunctional organosilicon compounds, polyfunctional organosilicon compounds, and combinations thereof.

5. The ceramer composition of claim 3, wherein the coupling agent comprises 3-(trimethoxysilyl)propylmethacrylate, 3-(triethoxysilyl)propylmethacrylate, or a mixture thereof.

6. The ceramer composition of claim 3, wherein the coupling agent comprises about 1 to about 15 weight percent of the ceramer composition.

7. The ceramer composition of claim 1, further comprising a plurality of colloidal inorganic oxide particles selected from the group consisting of alumina particles, titania particles, zirconia particles, ceria particles, antimony oxide particles, and combinations thereof.

8. The ceramer composition of claim 1, wherein the electrically conductive organic polymer is selected from the group consisting of polypyrroles, polythiophenes, and polyanilines.

9. The ceramer composition of claim 1, wherein the electrically conductive organic polymer comprises 3,4-polyethylenedioxythiophene.

10. The ceramer composition of claim 9, wherein the 3,4-polyethylenedioxythiophene is stabilized with polystyrene sulfonate.

11. The ceramer composition of claim 1, wherein the electrically conductive organic polymer comprises about 0.05 to about 10 weight percent of the ceramer composition.

12. The ceramer composition of claim 1, wherein the colloidal silica particles range in size from about 5 to about 100 nm.

13. The ceramer composition of claim 1, wherein the colloidal silica particles range in size from about 10 to about 50 nm.

14. The ceramer composition of claim 1, wherein the colloidal silica particles comprise from about 10 to about 50 weight percent of the composition.

15. The ceramer composition of claim 1, wherein the amide-containing compound is selected from the group consisting of N,N-disubstituted acetamides, N,N-disubstituted formamides, N,N-disubstituted acrylamides, N-substituted pyrolidinones, N-substituted formamides, N-substituted caprolactams, and combinations thereof.

16. The ceramer composition of claim 1, wherein the amide-containing compound is selected from the group consisting of N,N-dimethyl acetamide, 1-vinyl-2-pyrrolidinone, N-methylpyrrolidinone, N-vinyl caprolactam, N-vinyl formamide, N,N-dimethylacrylamide, and combinations thereof.

17. The ceramer composition of claim 1, wherein the amide-containing compound comprises about 1 to about 90 weight percent of the composition.

18. The ceramer composition of claim 1, wherein the binder precursor is selected from the group consisting of ethylenically unsaturated monomers, oligomers, or combinations thereof.

19. The ceramer composition of claim 1, wherein the binder precursor comprises a (meth)acrylic acid, a (meth)acrylic acid ester, an amide or a combination thereof.

20. The ceramer composition of claim 19, wherein the binder precursor is selected from the group consisting of N,N-dimethylacrylamide, pentaerythritol triacrylate, 2-hydroxyethylacrylate, 2-hydroxymethyl acrylate, N-vinyl pyrrolidinone, N-vinyl formamide and combinations thereof.

21. The ceramer composition of claim 1, wherein the binder precursor comprises about 5 to about 80 weight percent of the ceramer composition.

22. The ceramer composition of claim 1, wherein the colloidal silica particles are prepared from a silica sol having a pH in the range of about 2 to about 6.

23. A ceramer prepared from the ceramer composition of claim 1.

24. The ceramer of claim 23, wherein the ceramer is transparent.

25. The ceramer of claim 23, wherein the ceramer has a surface resistivity in the range of about $10^4$ to about $10^{12}$ ohms/square.

26. The ceramer of claim 23, wherein the ceramer is provided in the form a coating adhered to a substrate.

27. The ceramer of claim 26, wherein the ceramer coating has a thickness in the range of about 1 to about 30 micrometers.

28. The ceramer of claim 26, wherein the substrate is selected from the group consisting of storage containers for electronic devices, abrasive articles, faces of electronic display devices, packaging material, floor coverings, wall coverings, window coverings, and pressure sensitive adhesive tapes.

29. A ceramer composition comprising:

a plurality of colloidal silica particles;

a binder precursor;

a dispersion of an electrically conductive organic polymer; and a plurality of colloidal inorganic oxide particles selected from the group consisting of alumina particles, titania particles, zirconia particles, ceria particles, antimony oxide particles, and combinations thereof.

30. The ceramer composition of claim 29, further comprising a curing agent.

31. The ceramer composition of claim 29, further comprising a coupling agent.

32. The ceramer composition of claim 29, wherein the electrically conductive organic polymer is selected from the group consisting of polypyrroles, polythiophenes, and polyanilines.

33. The ceramer composition of claim 29, wherein the electrically conductive organic polymer comprises 3,4-polyethylenedioxythiophene.

34. The ceramer composition of claim 29, wherein the binder precursor is selected from the group consisting of ethylenically unsaturated monomers, oligomers, or combinations thereof.

35. A ceramer prepared from the ceramer composition of claim 29.

36. The ceramer of claim 35, wherein the ceramer has a surface resistivity in the range of about $10^4$ to about $10^{12}$ ohms/square.

37. The ceramer of claim 36, wherein the ceramer is provided in the form a coating adhered to a substrate.

38. A method of making a ceramer composition capable of producing a transparent ceramer, said method comprising the steps of:

a) combining an aqueous silica sol with a binder precursor to form a mixture;

b) drying the mixture of step a);

c) mixing an amide-containing compound with an electrically conductive organic polymer to form an electrically conductive organic dispersion; and d) combining the dispersion of electrically conductive organic polymer of step c) with the mixture of step b) to form the ceramer composition capable of producing a transparent ceramer.

39. The method of claim 38, wherein step a) includes combining the aqueous silica sol with a coupling agent and the binder precursor to form the mixture.

40. The method of claim 38, wherein the electrically conductive organic polymer of step c) is associated with a counter-ion.

41. The method of claim 38, wherein the counter-ion is a sulfonic acid.

42. A method of making an antistatic ceramer, said method comprising the steps of:

a) combining an aqueous silica sol with a binder precursor to form a mixture;

b) drying the mixture of step a);

c) mixing an amide-containing compound with an electrically conductive organic polymer to form an electrically conductive organic dispersion;

d) combining the dispersion of electrically conductive organic polymer of step c) with the mixture of step b) to form a ceramer composition; and e) curing the ceramer composition of step d) to form an antistatic ceramer.

* * * * *

UNITED STATES PATENT AND TRADEMARK OFFICE
CERTIFICATE OF CORRECTION

PATENT NO. : 6,299,799 B1
DATED : October 9, 2001
INVENTOR(S) : Bradley D. Craig and Zayn Bilkadi It is certified that error appears in the above-identified patent and that said Letters Patent is hereby corrected as shown below:

Column 7,
Line 45, "($C_4$-$C_4$)" should be -- $C_1$-$C_4$ --

Column 9,
Line 10, "acrylate, phenyl acrylate" should be -- acrylate, cyclohexyl acrylate, dimethladamantyl acrylate, 2-napthyl acrylate --

Column 10,
Line 39, "arc" should be -- are --

Column 14,
Line 22, "were were" should be -- were --

Column 15,
Line 17, "micrometcr" should be -- micrometer --

Column 19,
Line 11, after phrase "for this example." Please begin a new paragraph as follows
-- Step 2: Electrically Conductive Polymer --

Signed and Sealed this

Fourteenth Day of May, 2002

*Attest:*

JAMES E. ROGAN
*Attesting Officer*  *Director of the United States Patent and Trademark Office*